US012588761B2

(12) United States Patent
    Wang et al.

(10) Patent No.:   US 12,588,761 B2
(45) Date of Patent:        Mar. 31, 2026

(54) LIFTING DEVICE

(71) Applicant: Neatframe Limited, London (GB)

(72) Inventors: Hung-Tse Wang, New Taipei City
                (TW); Chun-Ping Tai, New Taipei City
                (TW)

(73) Assignee: Neatframe Limited, London (GB)

( * ) Notice:    Subject to any disclaimer, the term of this
                patent is extended or adjusted under 35
                U.S.C. 154(b) by 16 days.

(21) Appl. No.: 18/480,498

(22) Filed:      Oct. 3, 2023

(65)              Prior Publication Data

US 2024/0115048 A1      Apr. 11, 2024

Related U.S. Application Data

(60) Provisional application No. 63/414,909, filed on Oct.
     11, 2022.

(30)          Foreign Application Priority Data

Jul. 5, 2023    (TW) ................................. 112125017

(51) Int. Cl.
     *A47B 97/00*          (2006.01)
     *F16M 13/02*          (2006.01)
(52) U.S. Cl.
     CPC ........... *A47B 97/001* (2013.01); *F16M 13/02*
                (2013.01); *F16M 2200/047* (2013.01)
(58) Field of Classification Search
     CPC ........... A47B 97/001; A47B 2097/005; F16M
                11/02; F16M 11/043; F16M 11/046;
                        F16M 13/02; F16M 2200/047
     See application file for complete search history.

(56)              References Cited

U.S. PATENT DOCUMENTS 7,708,243 B2 *   5/2010   Wang ................. F16M 11/2021
                                                        248/404
     7,722,003 B2 *   5/2010   Ishizaki ............... F16M 11/105
                                                        248/920
                        (Continued)

FOREIGN PATENT DOCUMENTS

GB          2277439 A  * 11/1994   ......... F16M 11/2014
     TW          M482023        7/2014
                        (Continued)

OTHER PUBLICATIONS

"Office Action of Taiwan Counterpart Application", issued on Apr.
     10, 2024, p. 1-p. 14.

(Continued)

*Primary Examiner* — Eret C Mcnichols
     (74) *Attorney, Agent, or Firm* — Wolf, Greenfield &
     Sacks, P.C.

(57)              ABSTRACT

A lifting device of a display, is provided. The lifting device
includes a stationary member, a lifting member, and an
elastic module. The stationary member is suitable for being
fixed to a vertical plane. The lifting member is slidably
connected to the stationary member. The lifting member is
suitable for being fixed to a back portion of the display. The
lifting member is suitable for sliding relative to the station-
ary member between a first position and a second position
lower than the first position. The elastic module is coupled
between the stationary member and the lifting member. The
elastic module is suitable for exerting a pulling force oppo-
site to a gravity direction on the lifting member.

16 Claims, 23 Drawing Sheets

(56) References Cited

U.S. PATENT DOCUMENTS

| | | | | |
|---|---|---|---|---|
| 7,780,125 | B2 * | 8/2010 | Yen | F16M 11/10 |
| | | | | 248/920 |
| 7,784,747 | B2 * | 8/2010 | Gan | F16M 11/24 |
| | | | | 248/917 |
| 7,874,530 | B2 * | 1/2011 | Kim | F16M 11/046 |
| | | | | 248/176.1 |
| 8,047,479 | B2 * | 11/2011 | Liu | F16M 11/105 |
| | | | | 248/920 |
| 8,047,480 | B2 * | 11/2011 | Lien | F16M 11/24 |
| | | | | 248/162.1 |
| 8,111,507 | B2 * | 2/2012 | Chou | F16M 11/30 |
| | | | | 361/679.02 |
| 8,132,765 | B2 * | 3/2012 | Liu | F16M 11/046 |
| | | | | 248/346.06 |
| 9,046,214 | B2 * | 6/2015 | Chang | F16M 11/046 |
| 9,167,707 | B1 * | 10/2015 | Wang | H05K 5/0204 |
| 9,915,394 | B2 * | 3/2018 | Chen | F16M 11/28 |
| 9,976,699 | B2 * | 5/2018 | Hung | F16M 11/24 |
| 10,190,725 | B2 * | 1/2019 | Aoyagi | F16M 11/046 |
| 10,704,633 | B2 * | 7/2020 | Xu | F16M 11/046 |
| 11,334,111 | B2 * | 5/2022 | Kang | G02F 1/1333 |
| 12,022,948 | B1 * | 7/2024 | Irving | A47B 97/00 |
| 12,228,237 | B2 * | 2/2025 | Wang | F16M 11/425 |
| 2005/0184215 | A1 * | 8/2005 | Lin | F16F 1/10 |
| | | | | 248/676 |
| 2007/0102600 | A1 * | 5/2007 | Ishizaki | F16M 11/2014 |
| | | | | 248/917 |
| 2008/0237411 | A1 * | 10/2008 | Kim | F16M 11/046 |
| | | | | 248/122.1 |
| 2010/0045943 | A1 * | 2/2010 | Gillespie | G03B 21/10 |
| | | | | 353/79 |
| 2010/0155559 | A1 * | 6/2010 | Liu | F16M 11/2021 |
| | | | | 248/295.11 |
| 2010/0213151 | A1 | 8/2010 | Theesfeld et al. | |
| 2010/0252695 | A1 * | 10/2010 | Liu | F16M 11/2021 |
| | | | | 248/122.1 |
| 2013/0233984 | A1 * | 9/2013 | Huang | F16M 11/046 |
| | | | | 248/162.1 |
| 2014/0070065 | A1 | 3/2014 | Chang | |
| 2015/0330557 | A1 | 11/2015 | Aoyagi et al. | |
| 2018/0363836 | A1 | 12/2018 | Yen et al. | |
| 2019/0101240 | A1 * | 4/2019 | Hsu | F16M 11/42 |
| 2021/0034098 | A1 | 2/2021 | Kang et al. | |
| 2024/0115048 | A1 * | 4/2024 | Wang | A47B 97/001 |
| 2024/0117917 | A1 * | 4/2024 | Wang | F16M 11/041 |

FOREIGN PATENT DOCUMENTS

| | | | | |
|---|---|---|---|---|
| TW | I532944 | 5/2016 | | |
| TW | M630514 | 8/2022 | | |
| WO | WO-2014116169 A1 * | 7/2014 | | F16M 11/24 |
| WO | 2019241064 | 12/2019 | | |

OTHER PUBLICATIONS

"Search Report of Europe Counterpart Application", issued on Feb. 21, 2024, p. 1-p. 9.

Communication pursuant to Article 94(3) EPC dated Sep. 17, 2025 in connection with European Application No. 23201526.3.

Extended European Search Report dated Mar. 11, 2024 in connection with European Application No. 23201532.1.

* cited by examiner

100

121

120

110

100B

100C

121

110

121

120

1101

1104

1102                                                   1102

1201

1402(1401)                                        1402(1401)

1103

100D

LIFTING DEVICE

CROSS-REFERENCE TO RELATED APPLICATION

This application claims the priority benefit of U.S. provisional application Ser. No. 63/414,909, filed on Oct. 11, 2022, and Taiwan application serial no. 112125017, filed on Jul. 5, 2023. The entirety of each of the above-mentioned patent applications is hereby incorporated by reference herein and made a part of this specification.

BACKGROUND

Technical Field

The disclosure relates to a lifting device, and in particular to a lifting device of a display.

Description of Related Art

Large-size displays are often found in large venues or public spaces and are mostly fixed to walls or stands through mounting mechanisms. In detail, most of the conventional mounting mechanisms of the large-size displays cannot adjust the height from the ground after being fixed. Usually, only the angle of inclination of the display can be adjusted. Since the weight of the large-size display is more than tens of kilograms, it is very inconvenient if the user needs to dismantle the mounting mechanism and reassemble to adjust the height. The traditional height adjustment mechanism of the display is designed on the stand of the display. The effortless height adjustment design needs to internally integrate an electric lifting motor and a control circuit. The user operates a built-in control interface or a remote control device to output a control signal, so as to activate the electric lifting motor to provide the power required for lifting the display. Such effortless stand not only requires electric power, but also causes the large-size display unable to be directly mounted on the wall for use, which not only occupies additional configuration space, but also increases manufacture and construction costs.

SUMMARY

The disclosure provides a lifting device, which assists a user to manually adjust a height position of a display effortlessly.

An embodiment of the disclosure provides a lifting device of a display. The lifting device includes a stationary member, a lifting member, and multiple first springs. The stationary member is suitable for being fixed to a vertical plane. The lifting member is slidably connected to the stationary member. The lifting member is suitable for being fixed to a back portion of the display. The first springs are disposed on the stationary member and are connected to the lifting member. The lifting member slides relative to the stationary member in a vertical direction when the display or the lifting member is subjected to a manual force toward the vertical direction, and the first springs are stretched by the lifting member and exert a first elastic force on the lifting member, wherein the first elastic force is approximate to the weight of the lifting member and the weight of the display, and the lifting member and the display are held at a height position after the display or the lifting member is no longer subjected to the manual force.

In an embodiment of the disclosure, the first springs include multiple constant force springs, and lifting member is suitable to have the display mounted on a mounting structure of the lifting member.

In an embodiment of the disclosure, the lifting device further includes at least one sliding rail and at least one sliding seat. The sliding rail is fixed to the lifting member, and the sliding rail extends vertically. The sliding seat is fixed to the stationary member and slidably connected to the sliding rail.

In an embodiment of the disclosure, the lifting device further includes at least one sliding rod and at least one sliding block. The sliding rod is fixed to the lifting member, and the sliding rod extends vertically. The sliding block is fixed to the stationary member and slidably connected to the sliding rod.

In an embodiment of the disclosure, the lifting device further includes at least one frictional resistance module. The frictional resistance module is disposed on the stationary member and contacts the lifting member.

In an embodiment of the disclosure, the friction resistance module includes a base, a friction member, and at least one elastic member. The base is fixed to the stationary member. The friction member is movably disposed on the base and contacts the lifting member. The elastic member is disposed between the base and the friction member.

In an embodiment of the disclosure, the lifting device further includes multiple second springs. The second springs are disposed on the stationary member and are selectively connected to or separated from the lifting member. When the second springs are connected to the lifting member and the lifting member slides relative to the stationary member in the vertical direction, the first springs stretched by the lifting member generate a first elastic force, and the second springs stretched by the lifting member generate a second elastic force.

In an embodiment of the disclosure, the lifting device further includes an elasticity adjusting member. The elasticity adjusting member is disposed on the lifting member and is located between the stationary member and the lifting member. The elasticity adjusting member is suitable for switching between a disengaged position and an engaged position. The second springs are separated from the elasticity adjusting member located in the disengaged position, or the second springs are connected to the elasticity adjusting member located in the engaged position and are connected to the lifting member through the elasticity adjusting member.

In an embodiment of the disclosure, the second springs include multiple constant force springs.

Another embodiment of the disclosure provides a lifting device of a display. The lifting device includes a stationary member, a lifting member, a linear sliding module, and a first elastic module. The stationary member is suitable for being fixed to a vertical plane. The lifting member is suitable for being fixed to a back portion of the display. The linear sliding module is coupled between the stationary member and the lifting member. The lifting member is slidably connected to the stationary member through the linear sliding module so as to vertically slide relative to the stationary member between a first position and a second position lower than the first position. The first elastic module is coupled between the stationary member and the lifting member. The lifting member slides along the linear sliding module when the display or the lifting member is subjected to a manual force toward a vertical direction, and the first elastic module exerts a first pulling force on the lifting member. The first pulling force is approximate to the weight of the lifting member and the weight of the display, and the lifting member and the display are held at a height position after the display or the lifting member is no longer subjected to the manual force.

In another embodiment of the disclosure, the linear sliding module includes at least one sliding rail and at least one sliding seat slidably connected to the sliding rail. The sliding rail is fixed to the lifting member, and the sliding seat is fixed to the stationary member.

In another embodiment of the disclosure, the linear sliding module includes at least one sliding rod and at least one sliding block slidably connected to the sliding rod. The sliding rod is fixed to the lifting member, and the sliding block is fixed to the stationary member.

In another embodiment of the disclosure, the first elastic module includes multiple first springs disposed on the stationary member, and each first spring has a movable end connected to the lifting member.

In another embodiment of the disclosure, the lifting device further includes a second elastic module. The second elastic module is disposed on the stationary member and is located between the stationary member and the lifting member. The second elastic module is selectively connected to the lifting member. When the second elastic module is connected to the lifting member and the lifting member slides relative to the stationary member in the vertical direction, the first elastic module stretched by the lifting member exerts the first pulling force, and the second elastic module stretched by the lifting member exerts a second pulling force.

In another embodiment of the disclosure, the lifting device further includes a bolt. The bolt is slidably disposed on the lifting member and is located between the stationary member and the lifting member. The second elastic module includes multiple second springs and a positioning member. The second springs are disposed on the stationary member, and each second spring has a movable end. The movable ends of the second springs are fixed to the positioning member. The positioning member includes a positioning hole, the movable ends of the second springs are connected to the lifting member when the bolt is inserted into the position hole of the positioning member, and the movable ends of the second springs are separated from the lifting member when the bolt is not inserted into the positioning hole of the positioning member.

Yet another embodiment of the disclosure provides a lifting device of a display. The lifting device includes a stationary member, a lifting member, and an elastic module. The stationary member is suitable for being fixed to a vertical plane. The lifting member is slidably connected to the stationary member. The lifting member is suitable for being fixed to a back portion of the display, and the lifting member is suitable for sliding relative to the stationary member between a first position and a second position lower than the first position. The elastic module is coupled between the stationary member and the lifting member. The lifting member slides relative to the stationary member in a vertical direction when the display or the lifting member is subjected to a manual force toward the vertical direction, and the elastic module exerts a pulling force opposite to a gravity direction on the lifting member. The pulling force is approximate to the weight of the lifting member and the weight of the display, and the lifting member and the display are held at a height position after the display or the lifting member is no longer subjected to the manual force.

Based on the above, the user can quickly adjust the height position of the display only by manually pushing up or pulling down the lifting member or the display. On the other hand, the elastic module is disposed between the lifting member and the stationary member. As the lifting member lifts relative to the stationary member, the elastic module may be stretched to generate the elastic force and form the pulling force exerted on the lifting member, so as to hold the height position of the display, and prevent the lifting member and the display from falling unexpectedly. In addition, the pulling force exerted on the lifting member by the elastic module can assist the user in easily pushing up the lifting member or the display.

In order for the features and advantages of the disclosure to be more comprehensible, the following specific embodiments are described in detail in conjunction with the drawings.

DESCRIPTION OF THE EMBODIMENTS

Figure 1A:
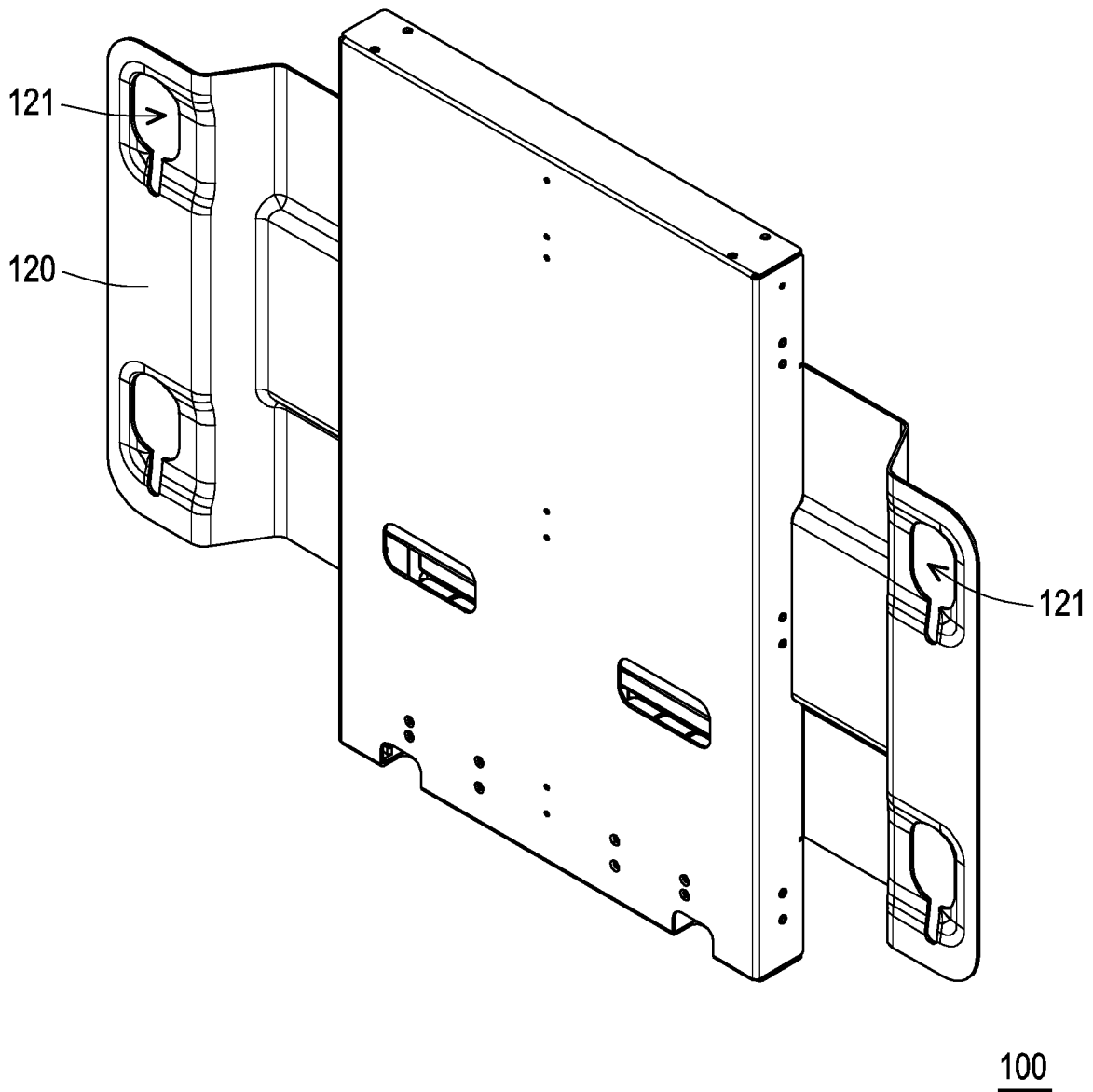
FIG. 1A is a schematic view of a lifting device according to a first embodiment of the disclosure.
Figure 1B:
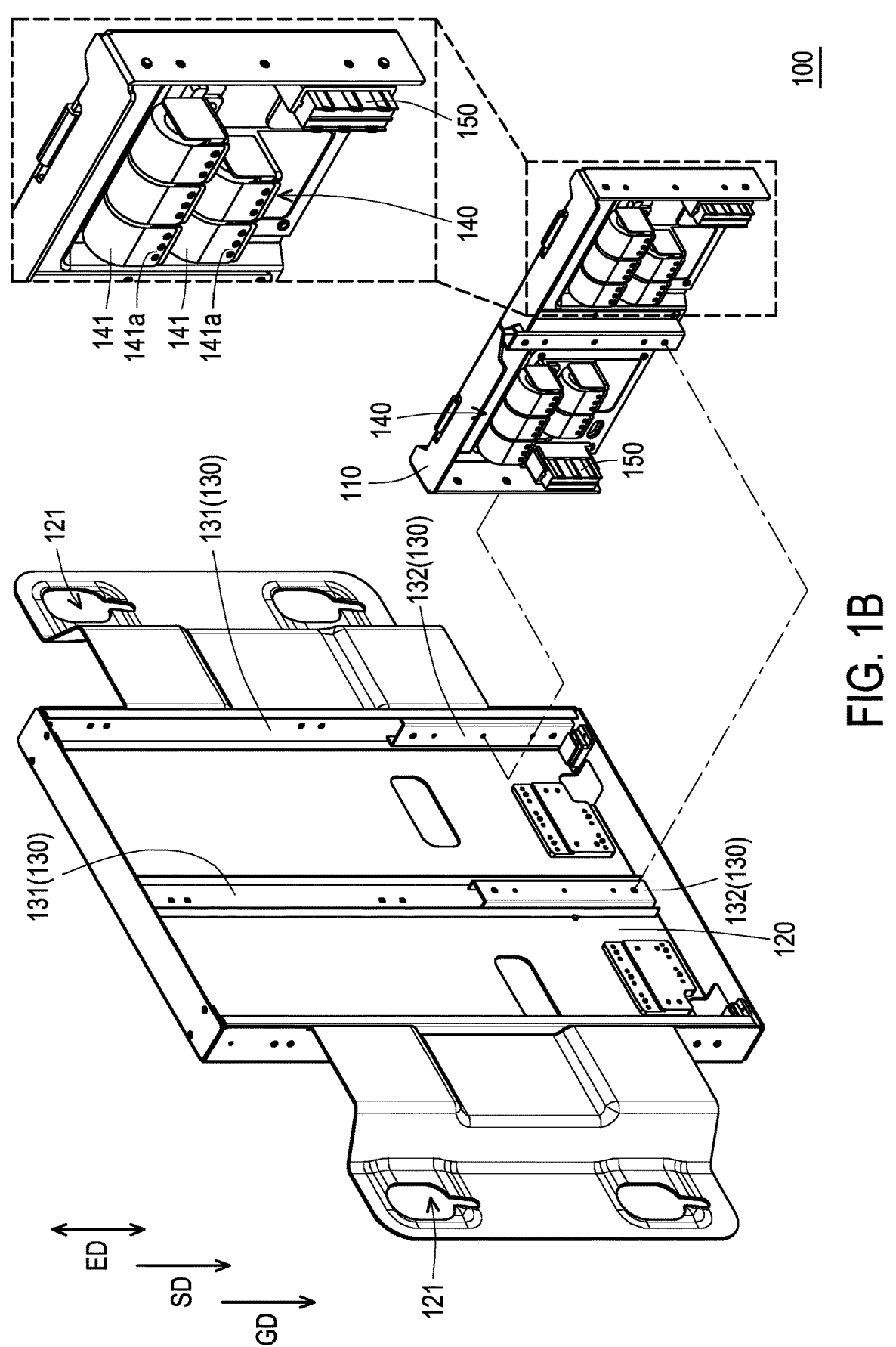
FIG. 1B is a schematic exploded view of the lifting device of FIG. 1A.
Figure 1C:
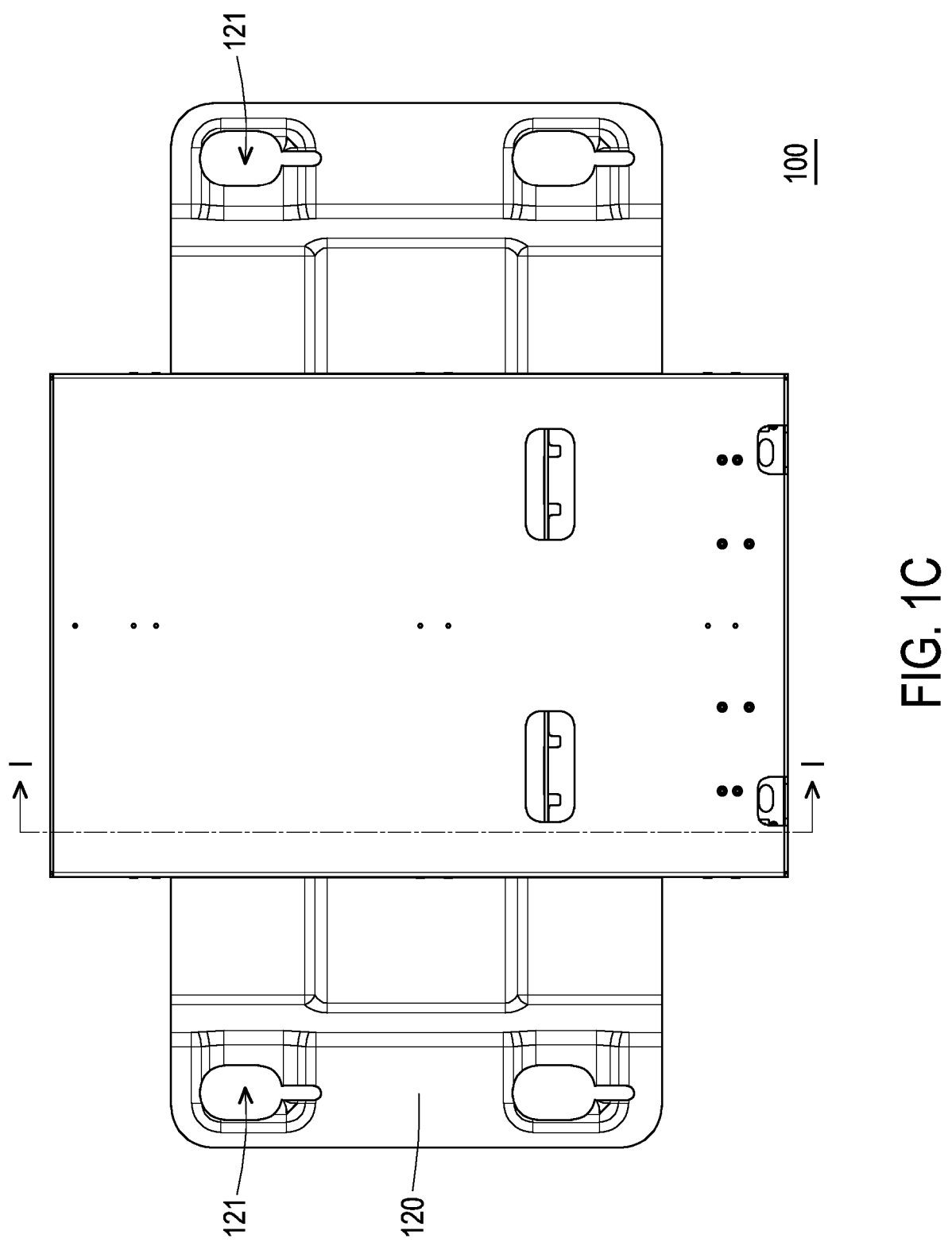
FIG. 1C is a schematic front view of the lifting device of FIG. 1A.

FIG. 1A is a schematic view of a lifting device according to a first embodiment of the disclosure. FIG. 1B is a schematic exploded view of the lifting device of FIG. 1A. FIG. 1C is a schematic front view of the lifting device of FIG. 1A. Please refer to FIG. 1A to FIG. 1C. In the embodiment, a lifting device 100 is suitable for mounting a display (not shown in the drawings), so that a user may manually adjust a height position of the display. In detail, the lifting device 100 includes a stationary member 110 and a lifting member 120 slidably connected to the stationary member 110, wherein the stationary member 110 may be fixed to a vertical plane (such as a wall surface perpendicular to the ground or a surface of a support perpendicular to the ground), and the lifting member 120 is suitable for being fixed to a back portion of the display. In other words, the back portion of the display is suitable for mounting on the lifting member 120.

In some embodiments, the lifting member 120 may be provided with mounting structures 121, such as hook holes or other applicable structures. For example, the back portion of the display may be provided with hooks or other applicable structures. By hooking the hook into the hook holes, the display may be mounted on the lifting member 120, so that the lifting member 120 and the display are fixed to each other. In other embodiments, the display and the lifting member 120 may be fixed to each other through locking, magnetic attraction, clamping, or other suitable installation manners.

Figure 1D:
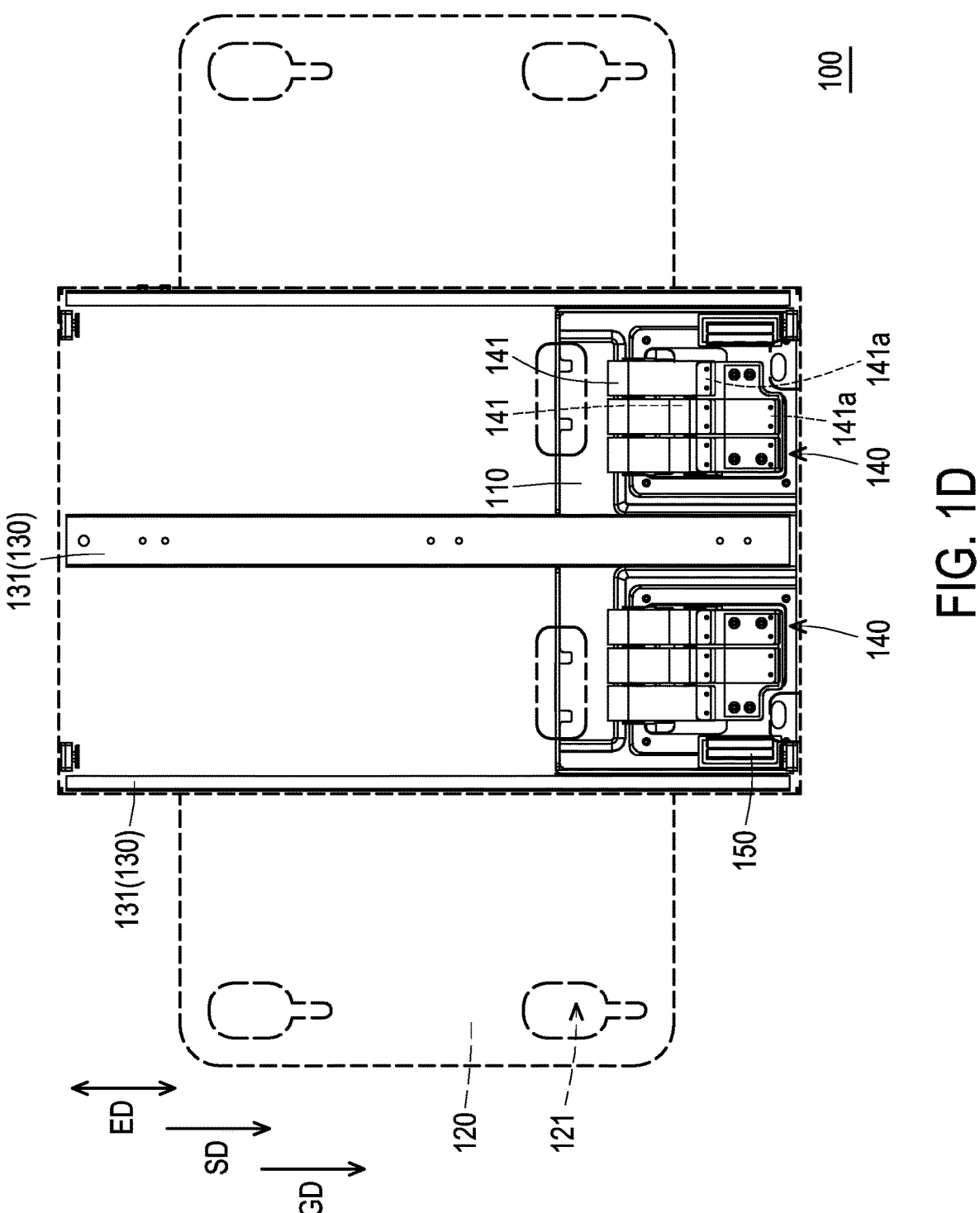
FIG. 1D is a schematic perspective view of the lifting device of FIG. 1C.
Figure 1E:
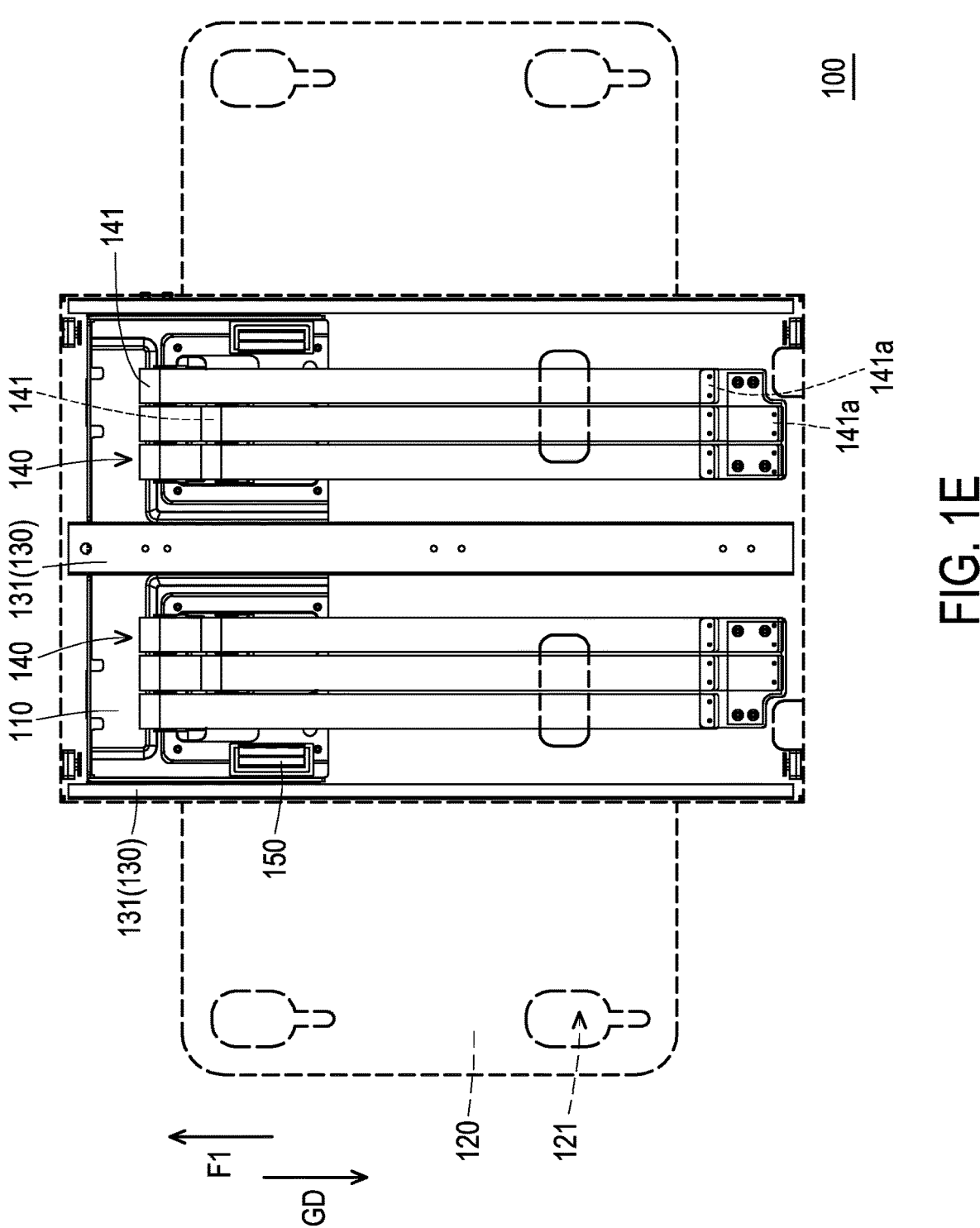
FIG. 1E is a schematic perspective view of the lifting device of FIG. 1D in another state.

FIG. 1D is a schematic perspective view of the lifting device of FIG. 1C. FIG. 1E is a schematic perspective view of the lifting device of FIG. 1D in another state. In order to clearly present the internal structural configuration, the lifting member 120 of FIG. 1D and FIG. 1E is shown with dashed lines. Please refer to FIG. 1B, FIG. 1D, and FIG. 1E. In the embodiment, the lifting device 100 further includes a linear sliding module 130, wherein the linear sliding module 130 is coupled between the stationary member 110 and the lifting member 120, and the lifting member 120 is slidably connected to the stationary member 110 through the linear sliding module 130. Specifically, the lifting member 120 may vertically slide relative to the stationary member 110 between a first position shown in FIG. 1D and a second position shown in FIG. 1E through the linear sliding module 130, so as to adjust the height position of the lifting member 120 and the display. The first position shown in FIG. 1D may be the highest height position, and the second position shown in FIG. 1E may be the lowest height position lower than the first position.

The linear sliding module 130 includes a sliding rail 131 and a sliding seat 132, wherein the sliding rail 131 is fixed to the lifting member 120, and the sliding seat 132 is fixed to the stationary member 110. In detail, the sliding seat 132 is slidably connected to the sliding rail 131, wherein the sliding seat 132 is stationary in operations, and the sliding rail 131 may slidingly move relative to the sliding seat 132 with the lifting member 120. On the other hand, the lifting member 120 or the display is suitable to be pulled down by a manual force toward a vertical direction SD, so as to be lowered from the first position shown in FIG. 1D to the second position shown in FIG. 1E or lowered to a middle position between the first position shown in FIG. 1D and the second position shown in FIG. 1E. In one of the embodiments, a moving direction ED of the sliding rail 131 is parallel to the vertical direction SD and the gravity direction GD. That is to say, the sliding rail 131 extends and slides vertically.

In some embodiments, the quantity of the linear sliding module 130 may be one or more, and the linear sliding module 130 may be arranged centrally, laterally, symmetrically, or in other applicable configurations. In some embodiments, the sliding rail 131 may be fixed to the stationary member 110, and the sliding seat 132 may be fixed to the lifting member 120, so the sliding rail 131 is stationary in operations, and the sliding seat 132 may slide along the sliding rail 131 with the lifting member 120.

As shown in FIG. 1B, FIG. 1D, and FIG. 1E, in some embodiments, the lifting device 100 further includes an elastic module 140 coupled between the stationary member 110 and the lifting member 120. As shown in FIG. 1D, when the lifting member 120 holds at the first position, the elastic module 140 is not stretched. At this time, the lifting member 120 and the display hold at the highest height position, wherein the bottom part of the lifting member 120 is at the same height as the stationary member 110. As shown in FIG. 1E, after the user manually pulls down the lifting member 120 or the display, the height position of the display can be quickly adjusted. For example, the lifting member 120 is lowered to the second position, which makes the display lowered to the lowest height position, wherein the top part of the lifting member 120 is at the same height as the stationary member 110. At this time, the elastic module 140 is stretched to generate an elastic force and form a pulling force F1 applied to the lifting member 120.

Specifically, the user only needs to manually push up or pull down the lifting member 120 or the display and the display can be quickly adjusted to a desired height position. For example, the display can be lifted by the user manually to the highest height position shown in FIG. 1D, lowered to the lowest height position shown in FIG. 1E, or lifted or lowered to a height between the highest height position shown in FIG. 1D and the lowest height position shown FIG. 1E.

When the lifting member 120 and the display leave the first position shown in FIG. 1D in the vertical direction SD, the elastic module 140 is stretched by the lifting member 120 and exerts the elastic force, and therefore the pulling force F1 applied on the lifting member 120. The pulling force F1 is approximate to the weight of the lifting member 120 and the weight of the display, which fixes the height position of the display. Since the pulling force F1 is opposite to the gravity direction GD, the elastic module 140 can prevent the lifting member 120 and the display from falling unexpectedly. In addition, when the user manually pushes up the lifting member 120 or the display, the pulling force F1 exerted by the elastic module 140 on the lifting member 120 can assist the user in easily pushing up the lifting member 120 or the display.

For example, when the display is mounted on the lifting member 120, under the weight of the display, the lifting member 120 may be slightly lowered to a third position located between the first position shown in FIG. 1D and the second position shown in FIG. 1E. The user may apply a manual force toward the vertical direction SD to pull down the lifting member 120 or the display, which causes the lifting member 120 and the display slide from the third position to a fourth position in the vertical direction SD, wherein the fourth position is higher than the second position shown in FIG. 1E and lower than the third position. Once the lifting member 120 or the display is no longer subjected to the force, the stretched elastic module 140 may exert the pulling force F1 on the lifting member 120 leaving the third position, so that the lifting member 120 and the display is held at the fourth position.

As shown in FIG. 1B, FIG. 1D, and FIG. 1E, in the embodiment, the elastic module 140 includes multiple springs 141 disposed on the stationary member 110, and each spring 141 has a movable end 141a fixed or connected to the lifting member 120. In detail, the movable end 141a of each spring 141 moves with the lifting member 120 along the lifting or lowering direction, which changes a stretching length of the spring 141. For example, the movable end 141a of each spring 141 may be fixed or connected to the lifting member 120 through clamping, buckling, magnetic attraction, riveting, adhesion, welding, melting, or other suitable installation manners.

For example, each spring 141 may be a constant force spring, which may be stretched by the lifting member 120 within a predetermined travel range and generate a constant elastic force, so as to exert a constant pulling force on the lifting member 120. In other examples, the spring 141 may be a tension spring or any elastic component that may be stretched to generate an elastic force.

For example, the quantity of the elastic modules 140 may be two, and the elastic modules 140 are symmetrically disposed on the stationary member 110. Depending on the actual design, the springs 141 of the elastic module 140 may be arranged in a row, in two rows, or in multiple rows, either vertically or horizontally. In addition, the quantity of the elastic modules 140 or the quantity of the springs 141 may be appropriately increased or decreased according to the actual design or the weights of the mounted displays.

Figure 1F:
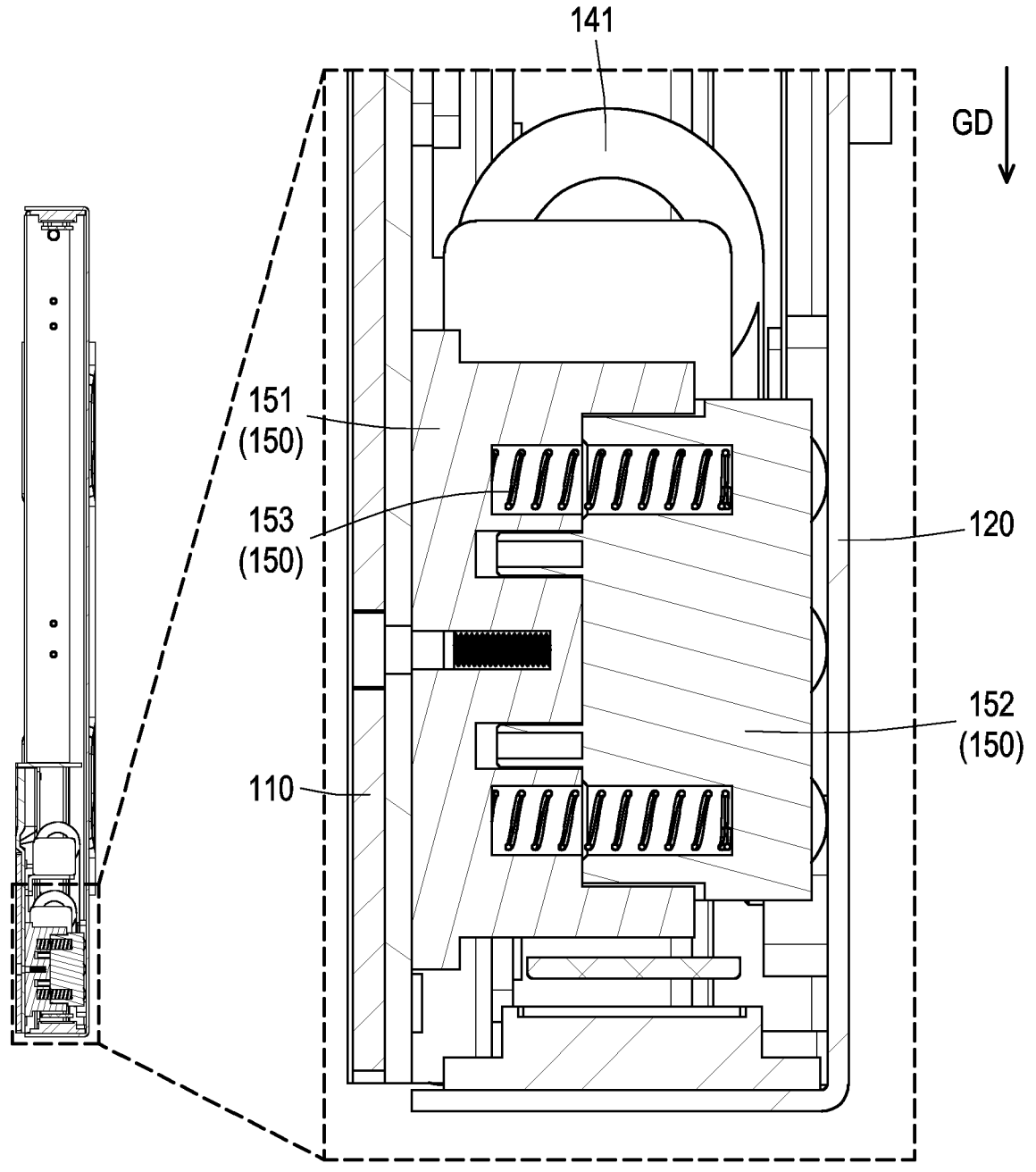
FIG. 1F is a schematic cross-sectional view of the lifting device of FIG. 1C along a line segment I-I.
Figure 1G:
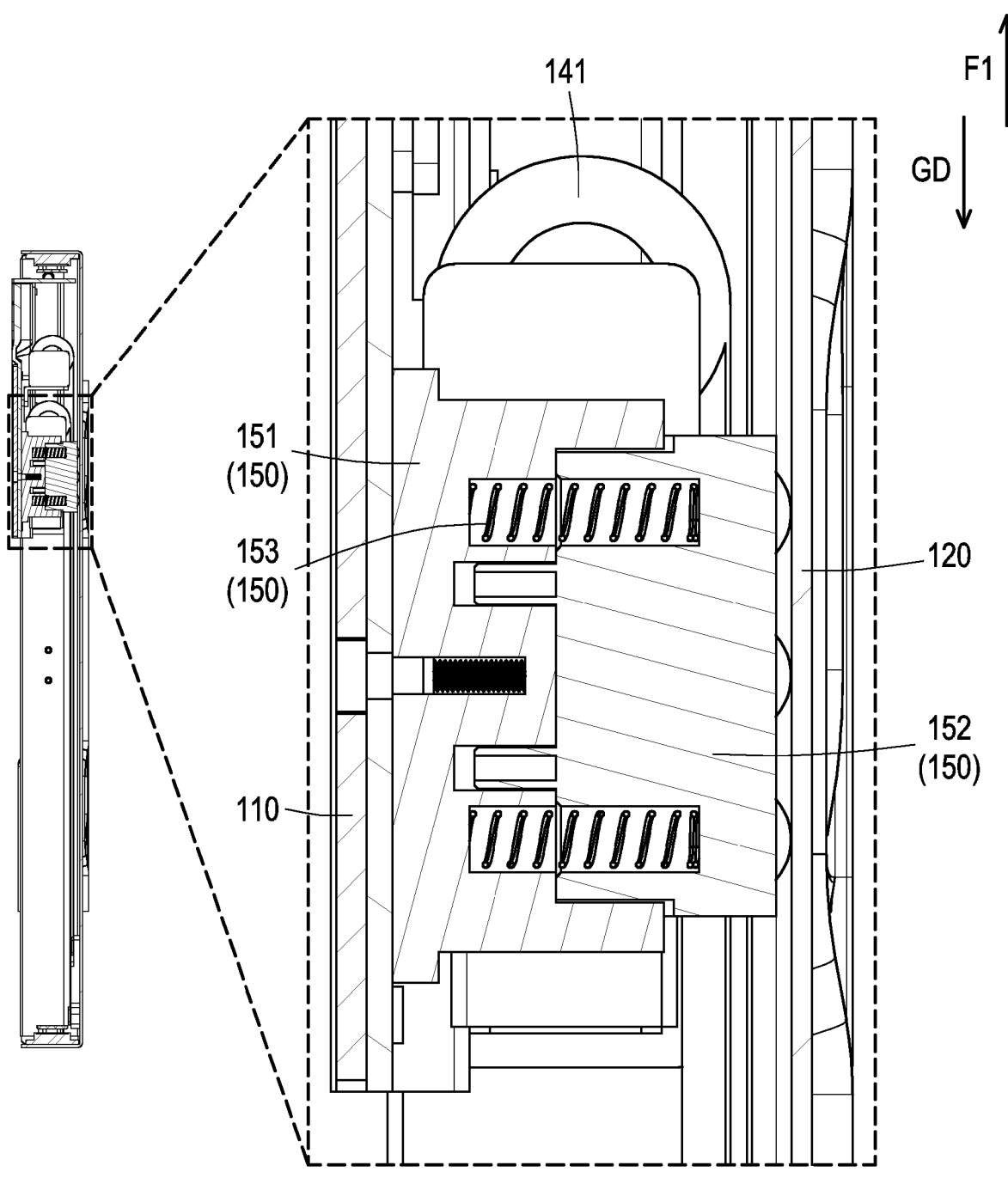
FIG. 1G is a schematic cross-sectional view of the lifting device of FIG. 1F in another state.

FIG. 1F is a schematic cross-sectional view of the lifting device of FIG. 1C along a line segment I-I. FIG. 1G is a schematic cross-sectional view of the lifting device of FIG. 1F in another state. As shown in FIG. 1B, FIG. 1F, and FIG. 1G, in some embodiments, the lifting device 100 further includes frictional resistance module 150, wherein the frictional resistance module 150 is disposed on the stationary member 110 and located on a side of the elastic module 140. The frictional resistance module 150 contacts the lifting member 120 and generates a frictional resistance on the lifting member 120, thereby securely holding the height position of the display together with the pulling force F1 exerted on the lifting member 120 by the elastic module 140, which prevents the lifting member 120 and the display from falling unexpectedly.

As shown in FIG. 1F and FIG. 1G, the frictional resistance module 150 includes a base 151, a friction member 152, and at least one elastic member 153, wherein the base 151 is fixed to the stationary member 110, and the friction member 152 is movably disposed on the base 151. The elastic member 153 may be a compression spring or other types of springs. The elastic member 153 may also be an elastic structure formed of elastomeric material such as polyurethane, rubber, plastic, and etc. The elastic member 153 is disposed between the base 151 and the friction member 152. Two opposite ends of the elastic member 153 respectively abut against the base 151 and the friction member 152, and the elastic member 153 remains in a compressed state to generate an elastic force. The elastic force generated by the elastic member 153 forms a thrust applied to the friction member 152, so as to push the friction member 152 against the lifting member 120 and generate the frictional resistance on the lifting member 120. When the lifting member 120 and the display are lowering, the frictional resistance provided by the friction member 152 and the elastic force provided by the spring are approximate to the weight of the lifting member 120 and the weight of the display. When the lifting member 120 and the display are lifting, the elastic force provided by the spring is approximate to the frictional resistance provided by the friction member 152, the weight of the lifting member 120 and the weight of the display. Therefore, the movement of the lifting member 120 and the display will stop when the manual force lifting or lowering the lifting member 120 and/or the display is no longer applied. The entire friction member 152 or only the part of the friction member 152 contacting the lifting member 120 may be made of a wear-resistant material, such as polyoxymethylene (POM), but not limited thereto.

For example, the quantity of the frictional resistance modules 150 may be two, and the frictional resistance modules 150 are symmetrically disposed on the stationary member 110. In addition, the quantity of the frictional resistance modules 150 may be appropriately increased or decreased according to the actual design or the weight of the mounted displays.

Figure 2:
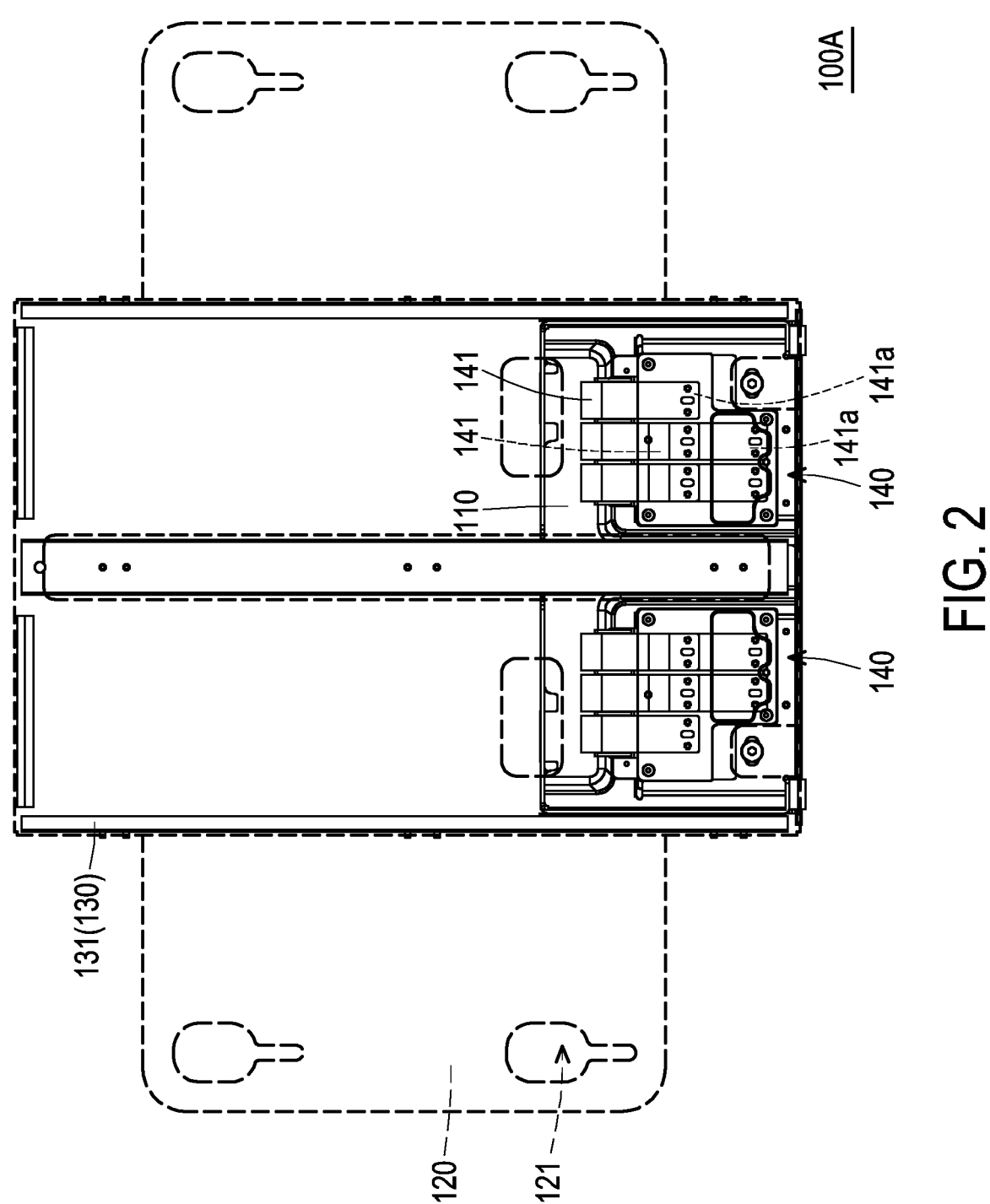
FIG. 2 is a schematic perspective view of a lifting device according to a second embodiment of the disclosure.

FIG. 2 is a schematic perspective view of a lifting device according to a second embodiment of the disclosure. In order to clearly present the internal structural configuration, the lifting member 120 of FIG. 2 is shown with dashed lines. Please refer to FIG. 2. The structural design or the design principle of a lifting device 100A of the embodiment is generally similar to the lifting device 100 of the first embodiment. The lifting device 100A of FIG. 2 provides that, if the elastic force provided by the spring 141 and/or the friction provided by the linear sliding module 130 are sufficient to carry the weight of the display, such that the display mounted on the lifting member 120 may maintain a stationary state when no force applied on the display or the lifting member 120, the friction resistance module 150 (see FIG. 1B, 1F, or 1G) can be omitted or removed, as in the lifting device 100A of the embodiment in FIG. 2.

Figure 3A:
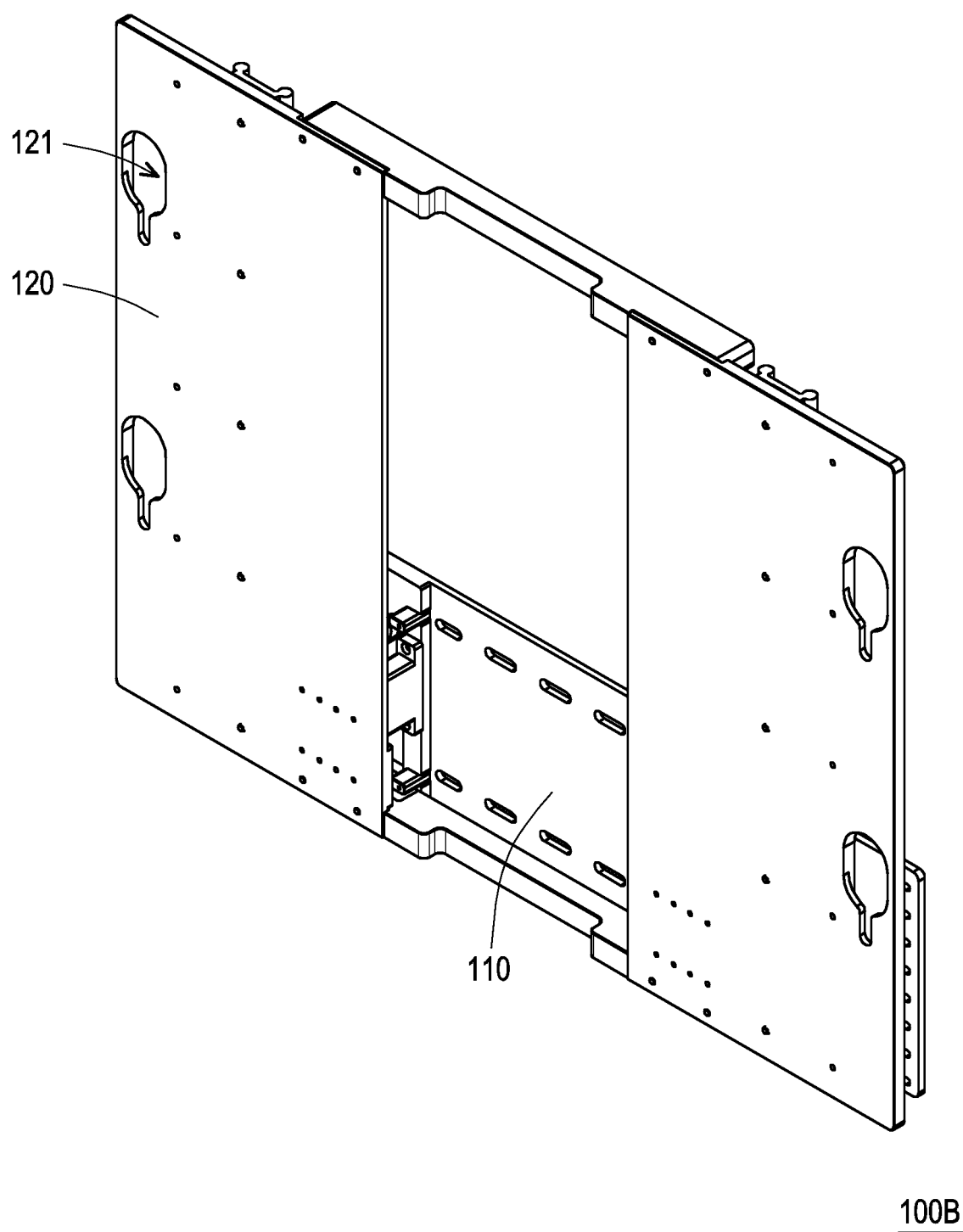
FIG. 3A is a schematic view of a lifting device according to a third embodiment of the disclosure.
Figure 3B:
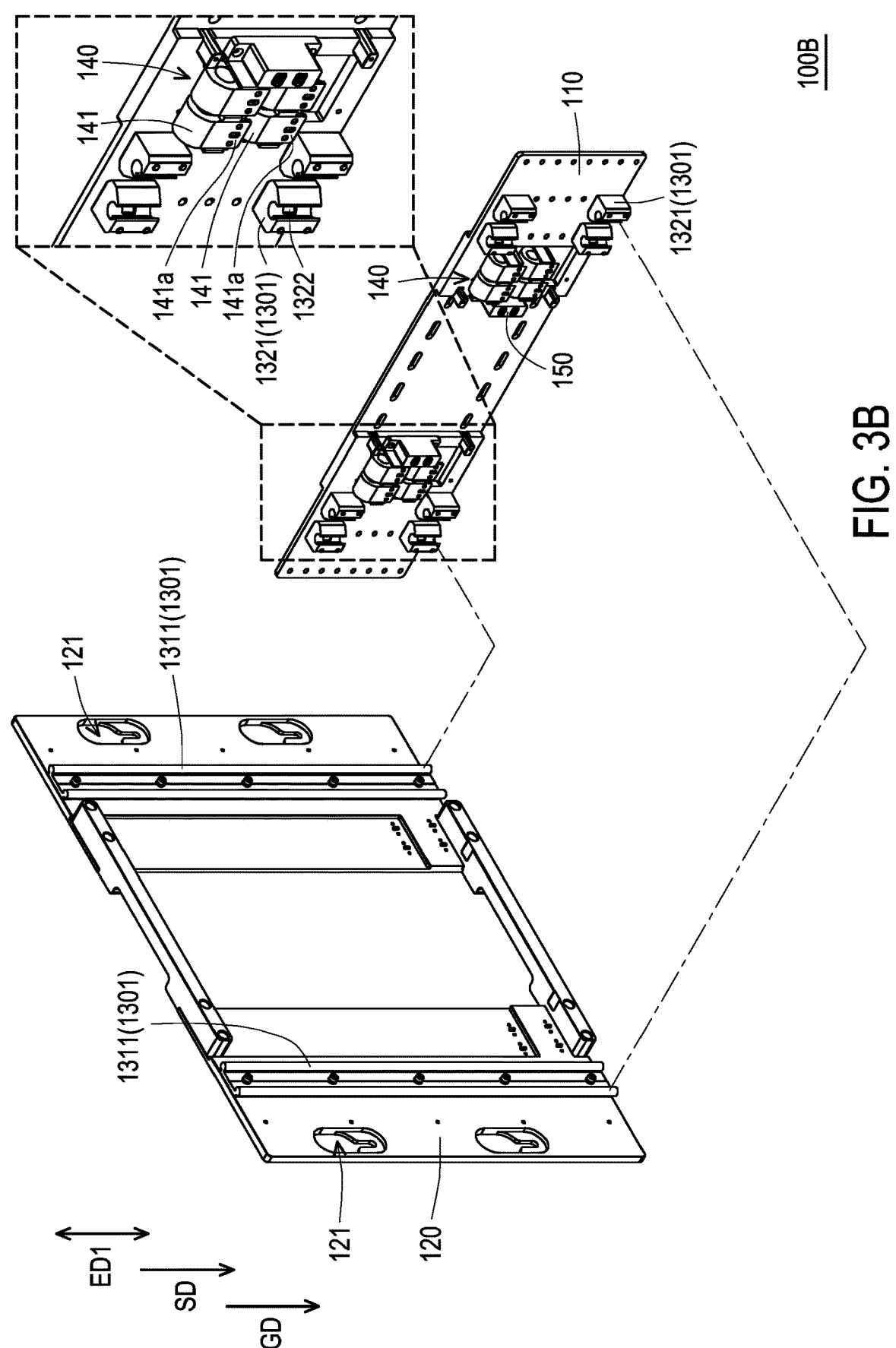
FIG. 3B is a schematic exploded view of the lifting device of FIG. 3A.
Figure 3C:
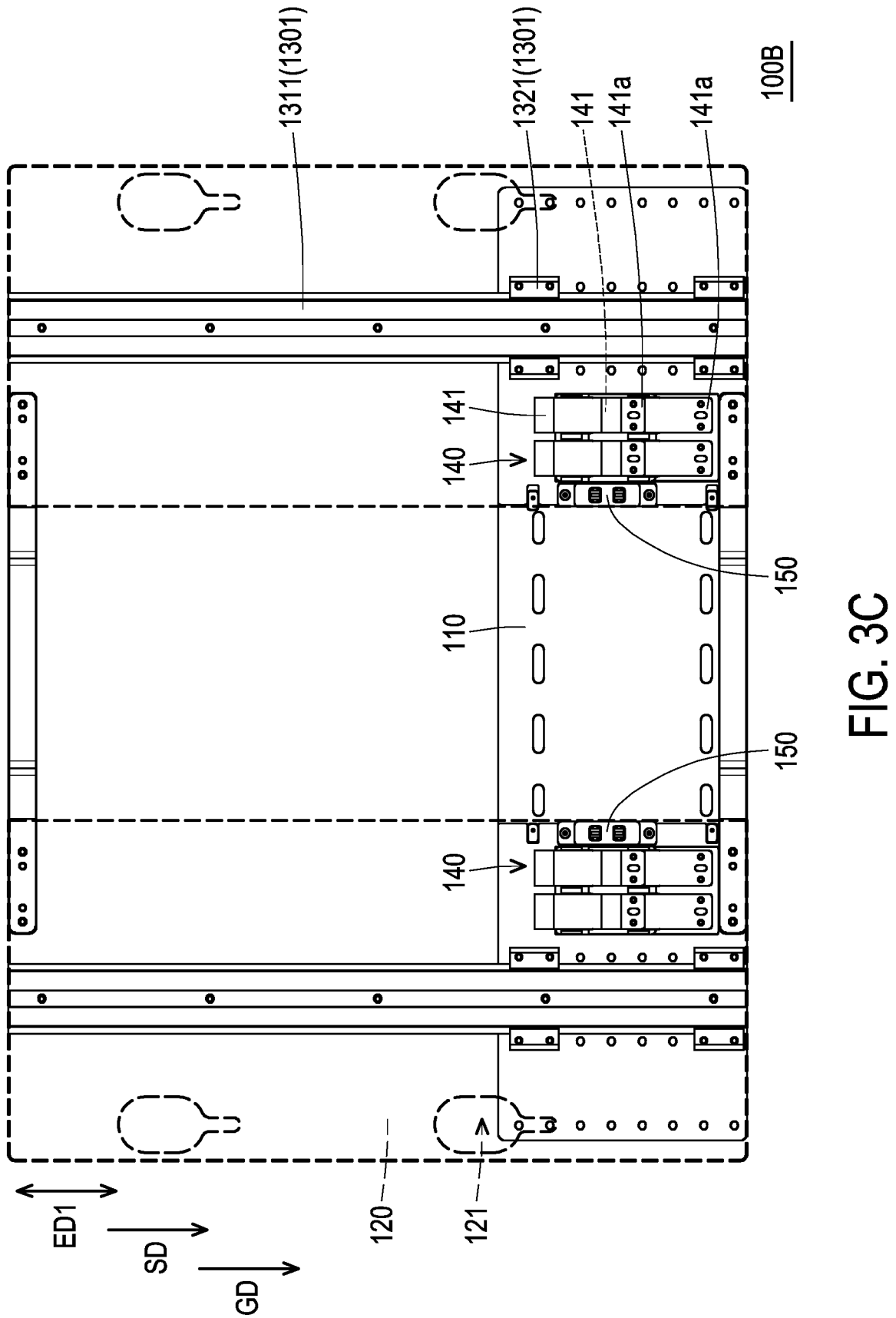
FIG. 3C is a schematic perspective view of the lifting device of FIG. 3A.
Figure 3D:
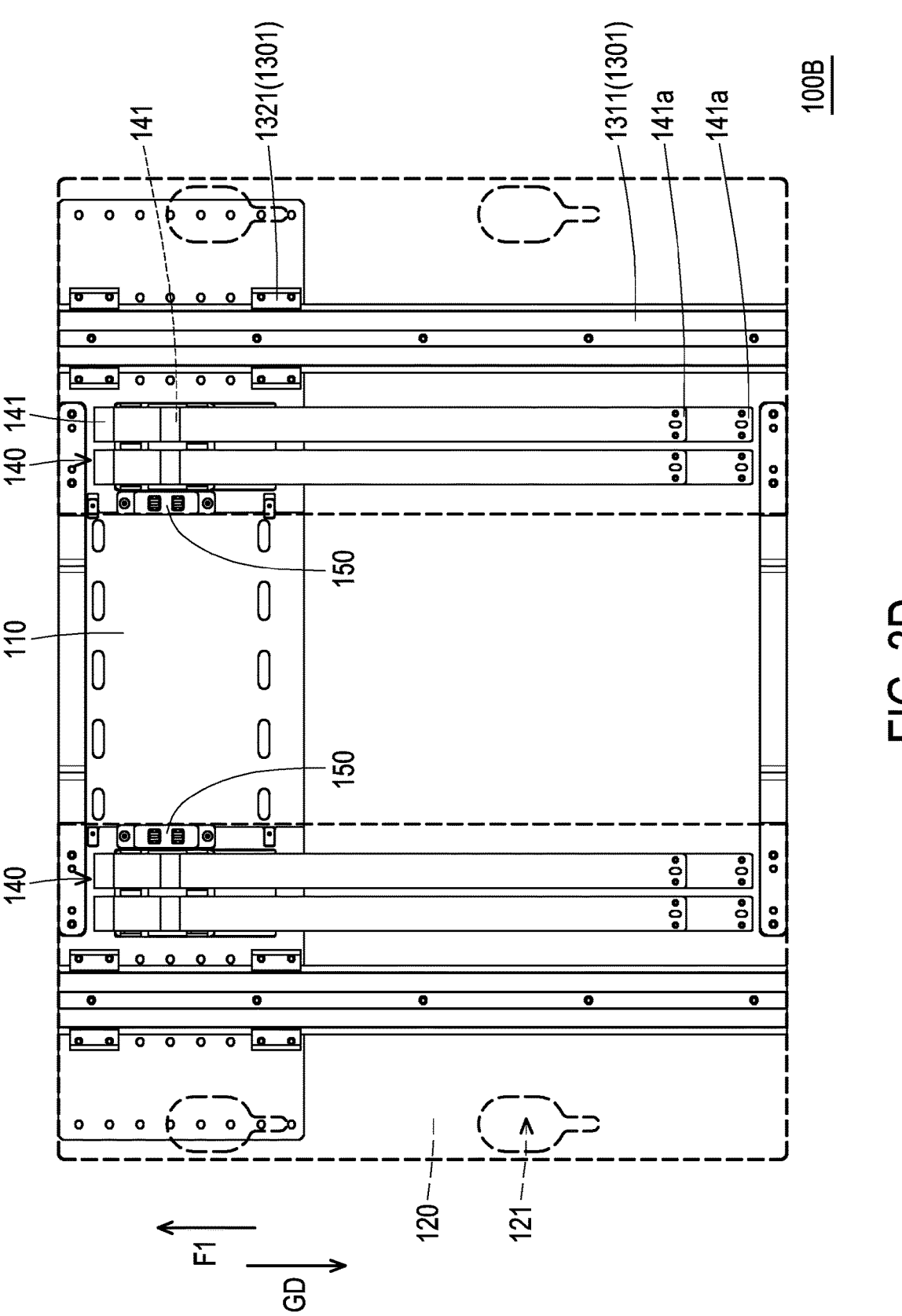
FIG. 3D is a schematic perspective view of the lifting device of FIG. 3A in another state.

FIG. 3A is a schematic view of a lifting device according to a third embodiment of the disclosure FIG. 3B is a schematic exploded view of the lifting device of FIG. 3A. FIG. 3C is a schematic perspective view of the lifting device of FIG. 3A. FIG. 3D is a schematic perspective view of the lifting device of FIG. 3A in another state. In order to clearly present the internal structural configuration, the lifting member 120 of FIG. 3C and FIG. 3D is shown with dashed lines. Please refer to FIG. 3A to FIG. 3D. The structural design or the design principle of a lifting device 100B of the embodiment is generally similar to the lifting device 100 of the first embodiment, and the main difference between the two is that in the embodiment, a linear sliding module 1301 includes a sliding rod 1311 and a sliding block 1321, wherein the sliding rod 1311 is fixed to the lifting member 120, and the sliding block 1321 is fixed to the stationary member 110. In detail, the sliding block 1321 is slidably sleeved on the sliding rod 1311, wherein the sliding block 1321 is stationary, and the sliding rod 1311 may slide relative to the sliding block 1321. On the other hand, the moving direction ED1 of the sliding rod 1311 is parallel to the vertical direction SD of the lifting member 120 and the gravity direction GD. That is to say, the sliding rod 1311 extends and slides vertically.

For example, the quantity of the linear sliding module 1301 may be one or more, and the linear sliding module 1301 may be arranged centrally, laterally, symmetrically, or in other applicable configurations. In addition, the sliding block 1321 may be provided with a roller 1322 for rotatably and slidably contact with the sliding rod 1311 in order to enhance the smoothness of lifting the lifting member 120.

Figure 4A:
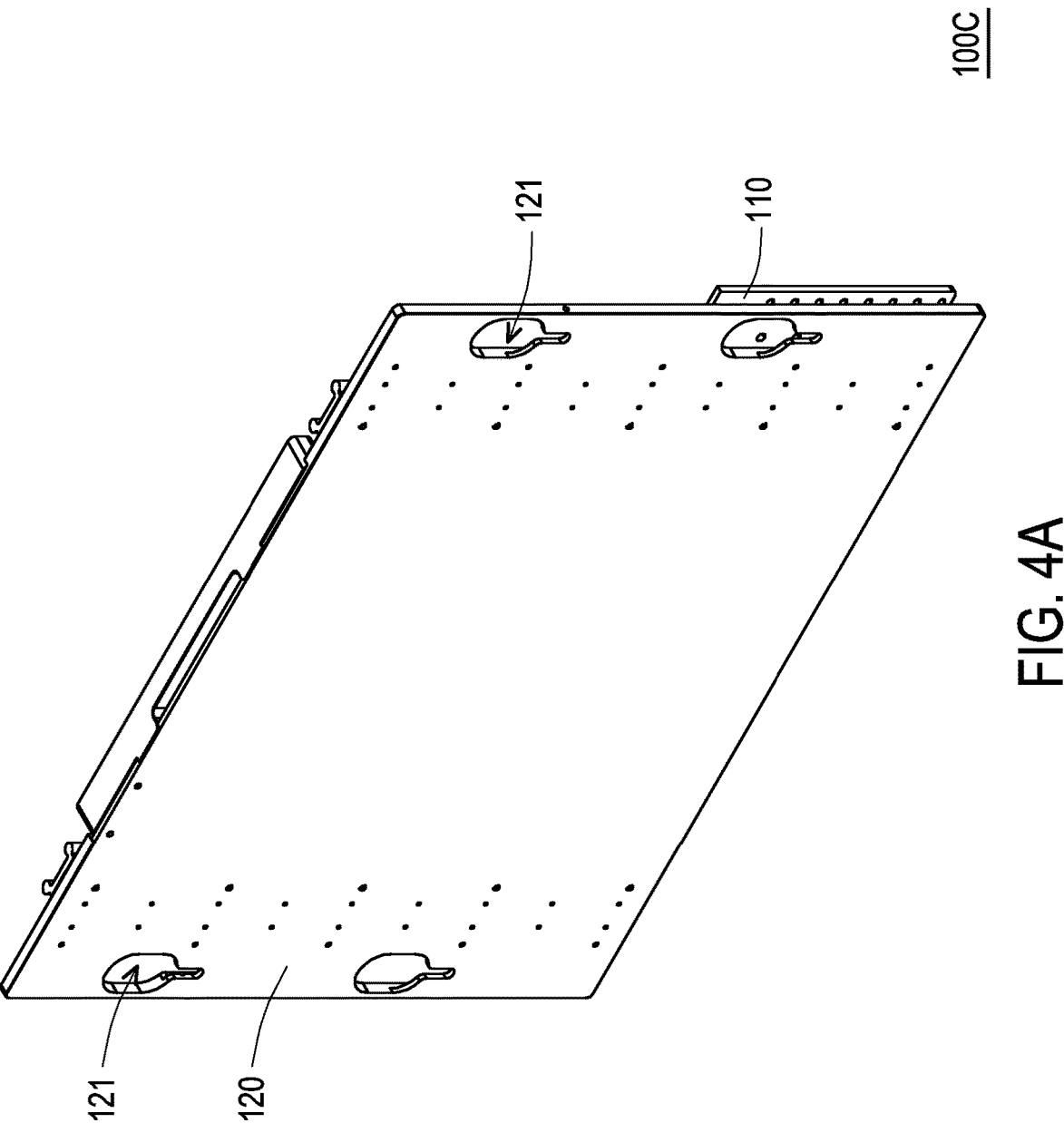
FIG. 4A is a schematic view of a lifting device according to a fourth embodiment of the disclosure.
Figure 4B:
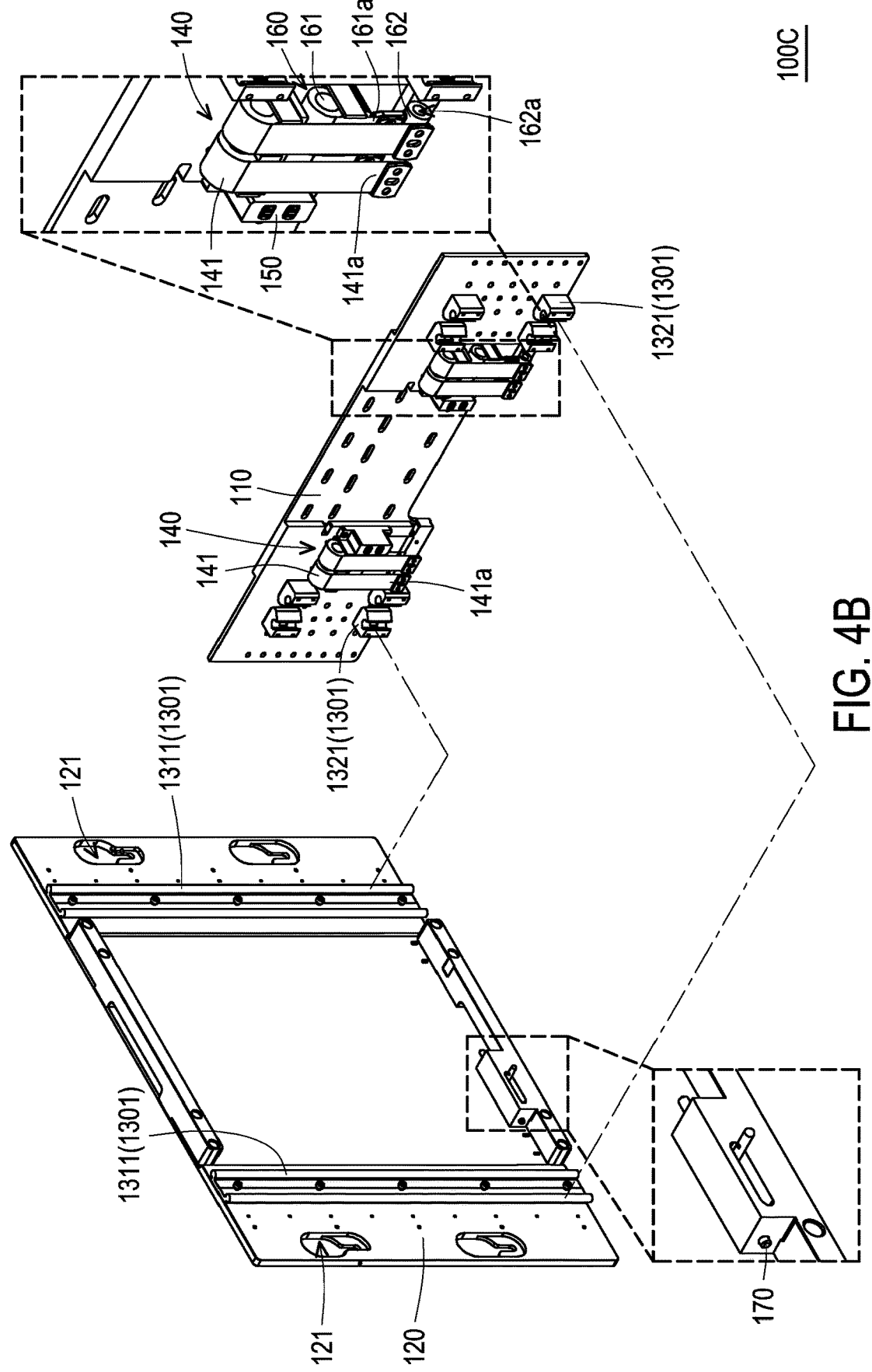
FIG. 4B is a schematic exploded view of the lifting device of FIG. 4A.
Figure 4C:
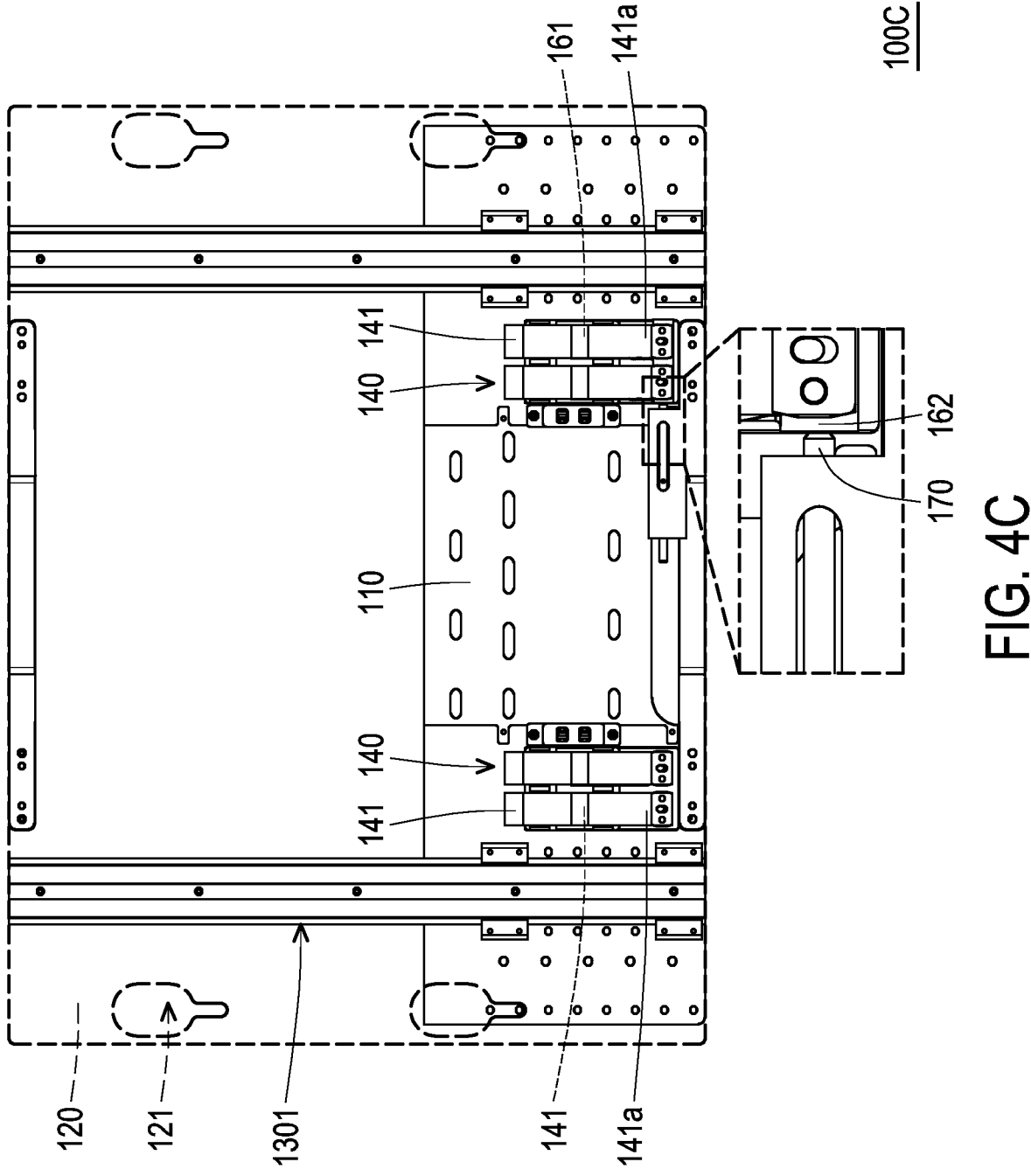
FIG. 4C is a schematic perspective view of the lifting device of FIG. 4A.

FIG. 4A is a schematic view of a lifting device according to a fourth embodiment of the disclosure FIG. 4B is a schematic exploded view of the lifting device of FIG. 4A. FIG. 4C is a schematic perspective view of the lifting device of FIG. 4A. In order to clearly present the internal structural configuration, the lifting member 120 of FIG. 4C is shown with dashed lines. Please refer to FIG. 4A to FIG. 4C. The structural design or the design principle of a lifting device 100C of the embodiment is generally similar to the lifting device 100B of the third embodiment, and the main difference between the two is that in the embodiment, the lifting device 100C further includes an elastic module 160, wherein the elastic module 160 is disposed on the stationary member 110 and located between the stationary member 110 and the lifting member 120. In detail, the elastic module 140 serves as the main source of the pulling force, while the elastic module 160 serves as the auxiliary source of the pulling force. In other words, the elastic module 140 remains in the active state, and the user may choose to activate or deactivate the elastic module 160 based on the actual situations or according to the weight of the display carried by the lifting member 120. Such design may be suitable for carrying various displays with relatively large weight or size differences.

Figure 4D:
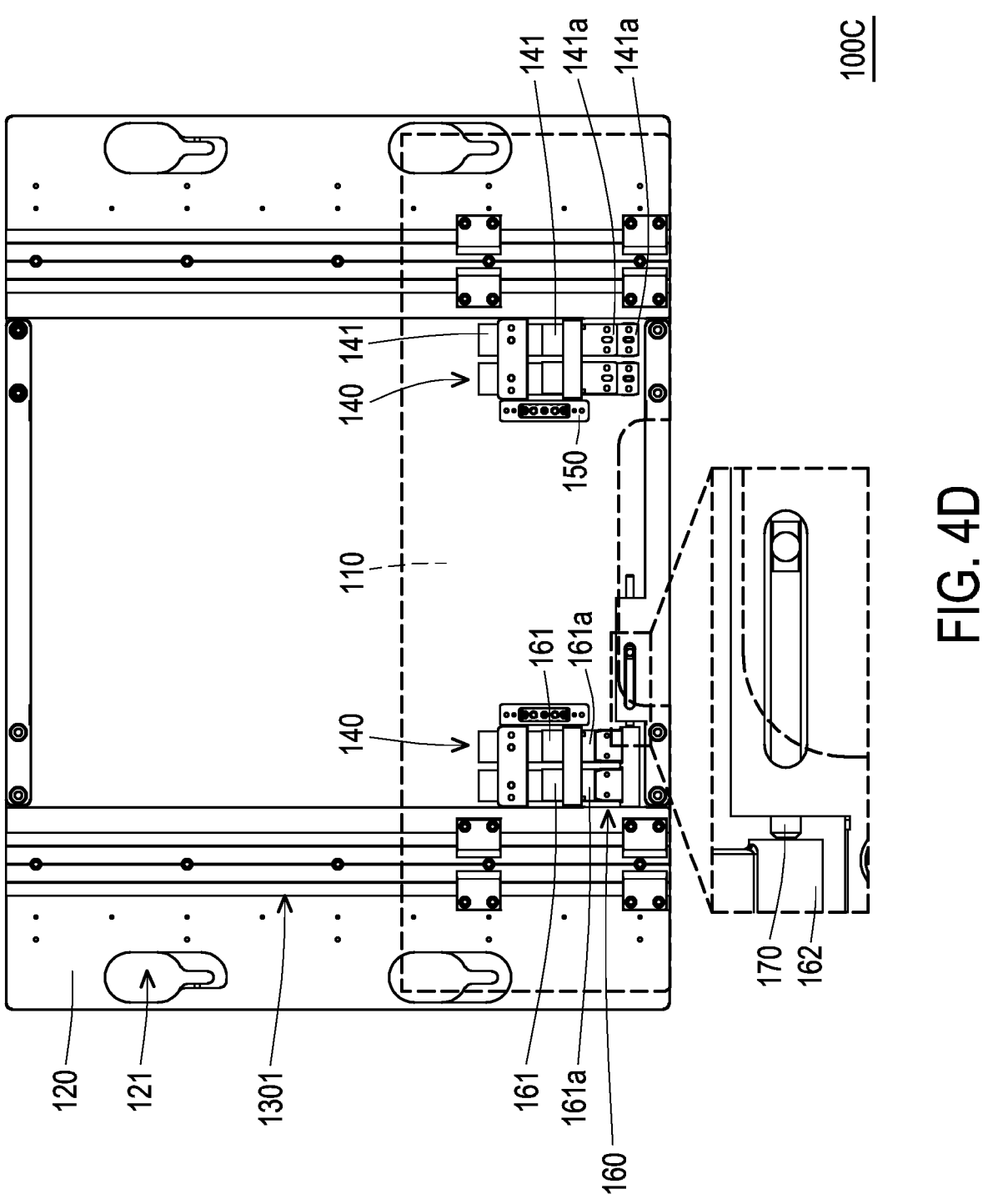
FIG. 4D is a schematic perspective view of the lifting device of FIG. 4C at another viewing angle.
Figure 4E:
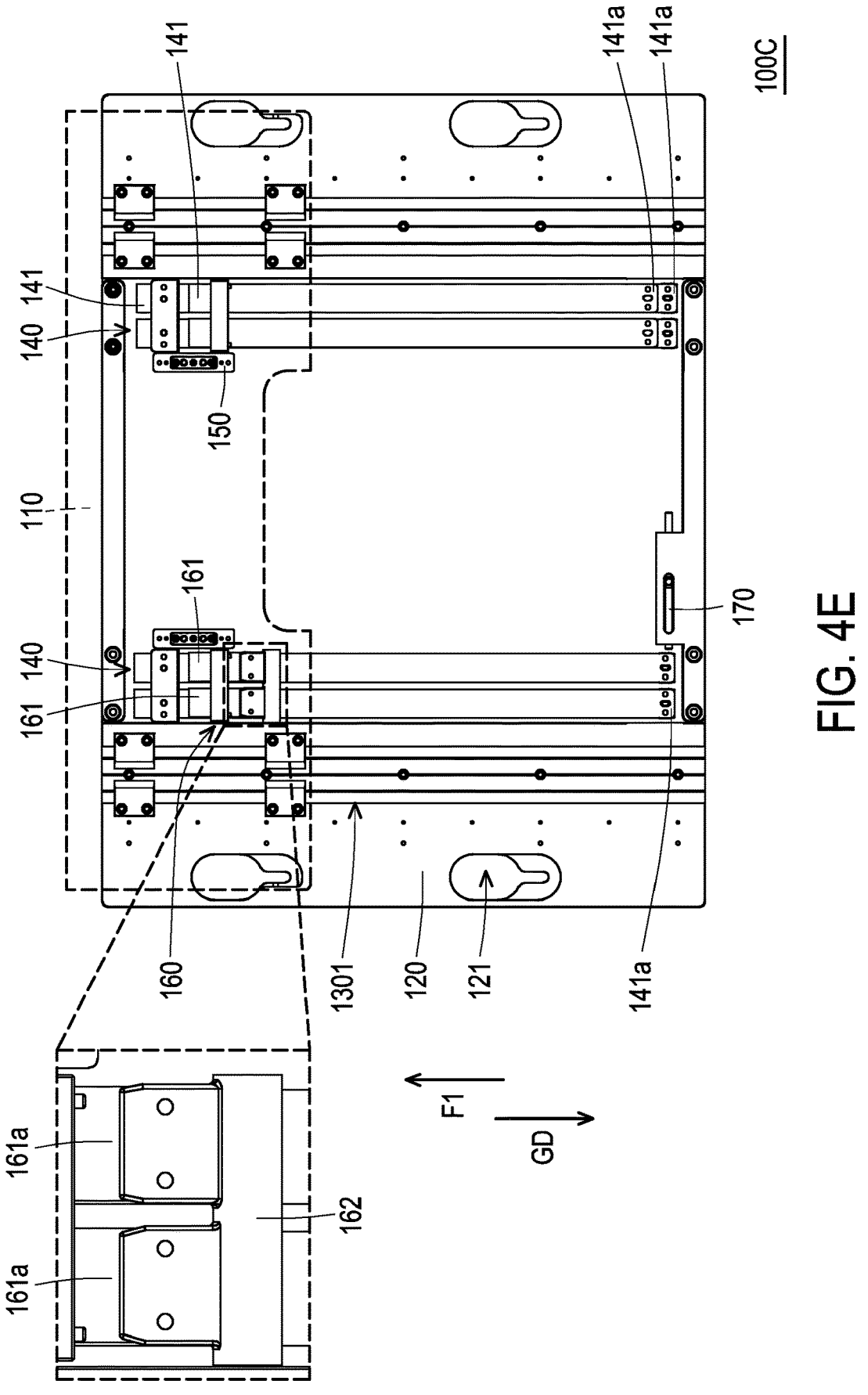
FIG. 4E is a schematic perspective view of the lifting device of FIG. 4D in another state.
Figure 4F:
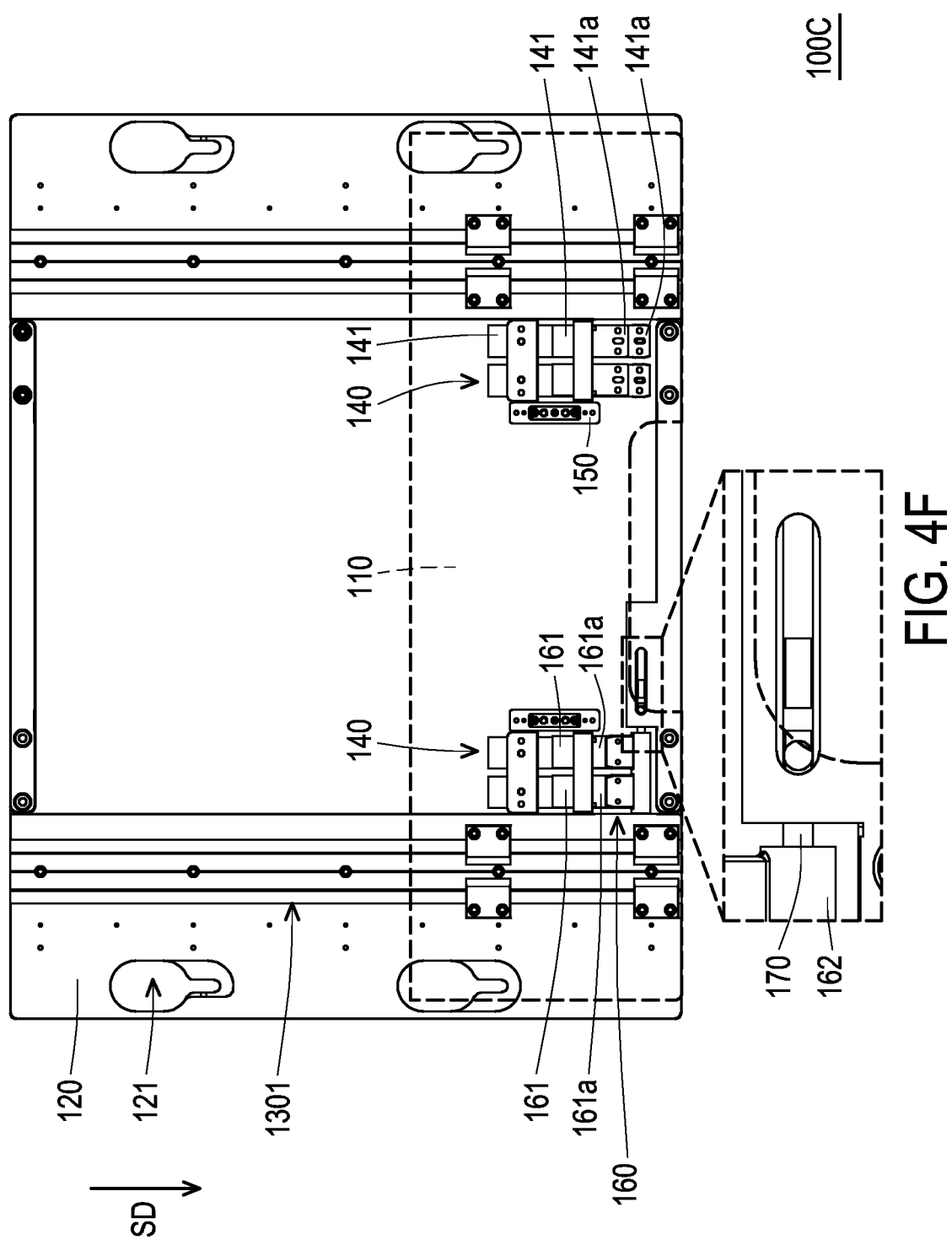
FIG. 4F is a schematic perspective view of the lifting device of FIG. 4D with increased pulling force.
Figure 4G:
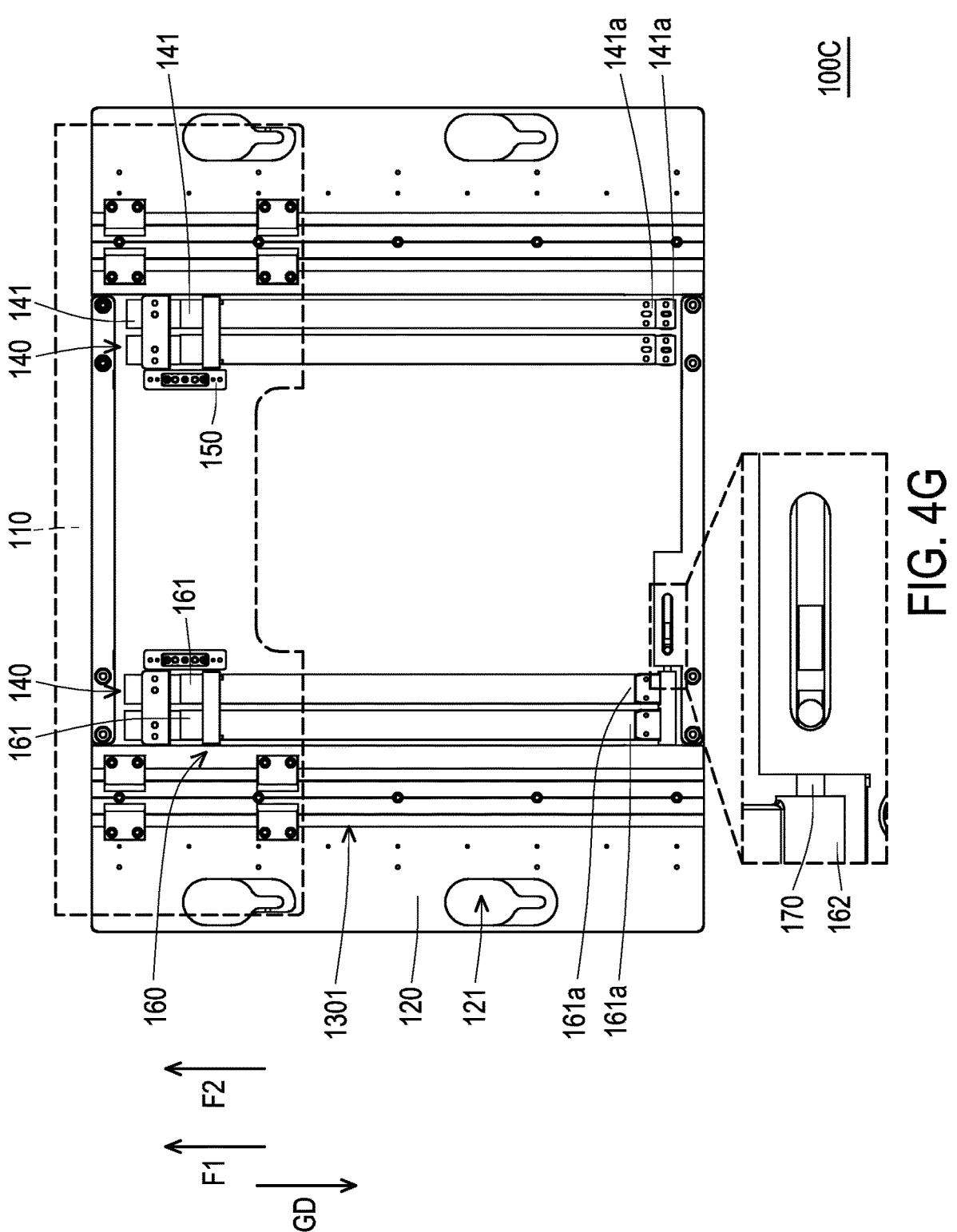
FIG. 4G is a schematic perspective view of the lifting device of FIG. 4F in another state.

FIG. 4D is a schematic perspective view of the lifting device of FIG. 4C at another viewing angle. FIG. 4E is a schematic perspective view of the lifting device of FIG. 4D in another state. FIG. 4F is a schematic perspective view of the lifting device of FIG. 4D with increased pulling force. FIG. 4G is a schematic perspective view of the lifting device of FIG. 4F in another state. In order to clearly present the internal structural configuration, the stationary element 110 of FIG. 4D to FIG. 4G is shown with dashed lines. As shown in FIG. 4B to FIG. 4D, the elastic module 160 may be disposed on a side of the elastic module 140, for example, the below side, and the elastic module 160 may include multiple springs 161. The springs 161 are disposed on the stationary member 110, and each spring 161 has a movable end 161a. For ease of adjusting the pulling force applied to the lifting member 120, the lifting device 100C further includes an elasticity adjusting member 170 disposed on the lifting member 120, wherein the elasticity adjusting member 170 is located between the stationary member 110 and the lifting member 120, and corresponds to the movable ends 161a of the springs 161.

As shown in FIG. 4C to FIG. 4E, the elasticity adjusting member 170 is in a disengaged position separated from the movable ends 161a of the springs 161. In other words, the elasticity adjusting member 170 in the disengaged position does not restrain or structurally interfere with the movable ends 161a of the springs 161, so the elastic module 160 is disconnected and deactivated. In the case where the elastic module 160 is deactivated, only the elastic module 140 exerts the pulling force F1 on the lifting member 120 when the lifting member 120 is lifted.

As shown in FIG. 4F, when the lifting member 120 is held at the first position, the elasticity adjusting member 170 may be switched to an engaged position to be connected to the movable ends 161a of the springs 161. In other words, the elasticity adjusting member 170 in the engaged position may restrain or structurally interfere with the movable ends 161a of the springs 161, such that the movable ends 161a of the springs 161 are connected to the lifting member 120 through the elasticity adjusting member 170, so as to activate the elastic module 160.

As shown in FIG. 4F, the lifting member 120 is held at the first position, and neither the elastic module 140 nor the elastic module 160 is stretched. At this time, the lifting member 120 and the display remain at the highest height position. As shown in FIG. 4G, the user may manually pull down the lifting member 120 or the display to quickly adjust the height of the display for example, by lowering the lifting member 120 to the second position, so that the display is lowered to the lowest height position. At this time, the elastic module 140 is stretched to generate the elastic force which forms the pulling force F1 applied to the lifting member 120. In addition, the elastic module 160 is also stretched to generate an elastic force which forms the pulling force F2 applied to the lifting member 120.

In the case where the elastic module 160 is activated, when the lifting member 120 and the display leave the first position shown in FIG. 4F in the vertical direction SD, the elastic module 140 and the elastic module 160 are simultaneously stretched by the lifting member 120 and individually generating elastic forces, which form the pulling force F1 and the pulling force F2 respectively applied to the lifting member 120, so as to hold the height position of the display. The pulling force F1 in addition to the pulling force F2 can bear a heavier display mounted on the lifting member 120. Since the pulling force F1 and the pulling force F2 are opposite to the gravity direction GD, the elastic module 140 and the elastic module 160 can prevent the lifting member 120 and the display with heavier weight from falling unexpectedly. In addition, when the user manually pushes up the lifting member 120 or the display, the pulling force F1 applied to the lifting member 120 by the elastic module 140 and the pulling force F2 applied to the lifting member 120 by the elastic module 160 can assist the user to in easily raising the lifting member 120 with the display with heavier weight.

For example, each spring 161 may be a constant force spring, and each spring 161 may be stretched by the lifting member 120 within a predetermined travel range to generate a constant elastic force, so as to exert a constant pulling force on the lifting member 120. In other examples, the spring 161 may be a tension spring or any elastic components that may be stretched to generate an elastic force.

As shown in FIG. 4B to FIG. 4D, the elastic module 160 further includes a positioning member 162, wherein the movable ends 161a of the springs 161 are fixed to the positioning member 162, and the positioning member 162 is disposed corresponding to the elasticity adjusting member 170. For example, the movable end 161a of spring 161 may be fixed to the positioning member 162 through clamping, buckling, magnetic attraction, riveting, adhesion, welding, melting, or other suitable installation manners.

As shown in FIG. 4B, the elasticity adjusting member 170 may be a bolt slidably disposed on the lifting member 120, and the positioning member 162 has a positioning hole 162a corresponding to the bolt. As shown in FIG. 4B, FIG. 4D, and FIG. 4E, the bolt is in a disengaged position separated from the positioning member 162 or is not inserted into the positioning hole 162a of the positioning member 162, so that the movable ends 161a of the springs 161 and the positioning member 162 are separated from or disconnected with the lifting member 120. In other words, the bolt in the disengaged position does not structurally interfere with the positioning member 162, and as the lifting member 120 being raised or lowered, the movable ends 161a of the springs 161 and the positioning member 162 remain stationary, so that the springs 161 are not stretched with the lifting of the lifting member 120.

As shown in FIG. 4B and FIG. 4F, when the lifting member 120 is held at the first position, the user may toggle the bolt to move to the engaged position or insert into the positioning hole 162a of the positioning member 162, causing structural interference between the bolt and the positioning member 162. As shown in FIG. 4F and FIG. 4G, the movable ends 161a of the springs 161 are connected to the lifting member 120 through the positioning member 162 and the bolt at the engaged position. The movable ends 161a of the springs 161 and the positioning member 162 may move with the lifting member 120 raised or lowered, allowing the springs 161 to be stretched with the lifting of the lifting member 120.

For example, when the display is mounted on the lifting member 120, the lifting member 120 may be slightly lowered from the first position shown in FIG. 4F to the third position located between the first position shown in FIG. 4F and the second position shown in FIG. 4G by the weight of the display. Then the user may apply a manual force toward the vertical direction SD to pull down the lifting member 120 or the display, so that the lifting member 120 and the display slide down from the third position to the fourth position in the vertical direction SD, wherein the fourth position is higher than the second position shown in FIG. 4G and lower than the third position. After the lifting member 120 or the display is no longer subjected to the force, the pulling force F1 exerted by the stretched elastic module 140 is applied to the lifting member 120 leaving the third position, and the stretched elastic module 160 may also exert the pulling force F2 on the lifting member 120 leaving the third position, so that the lifting member 120 and the display can be held at the fourth position.

Figure 5A:
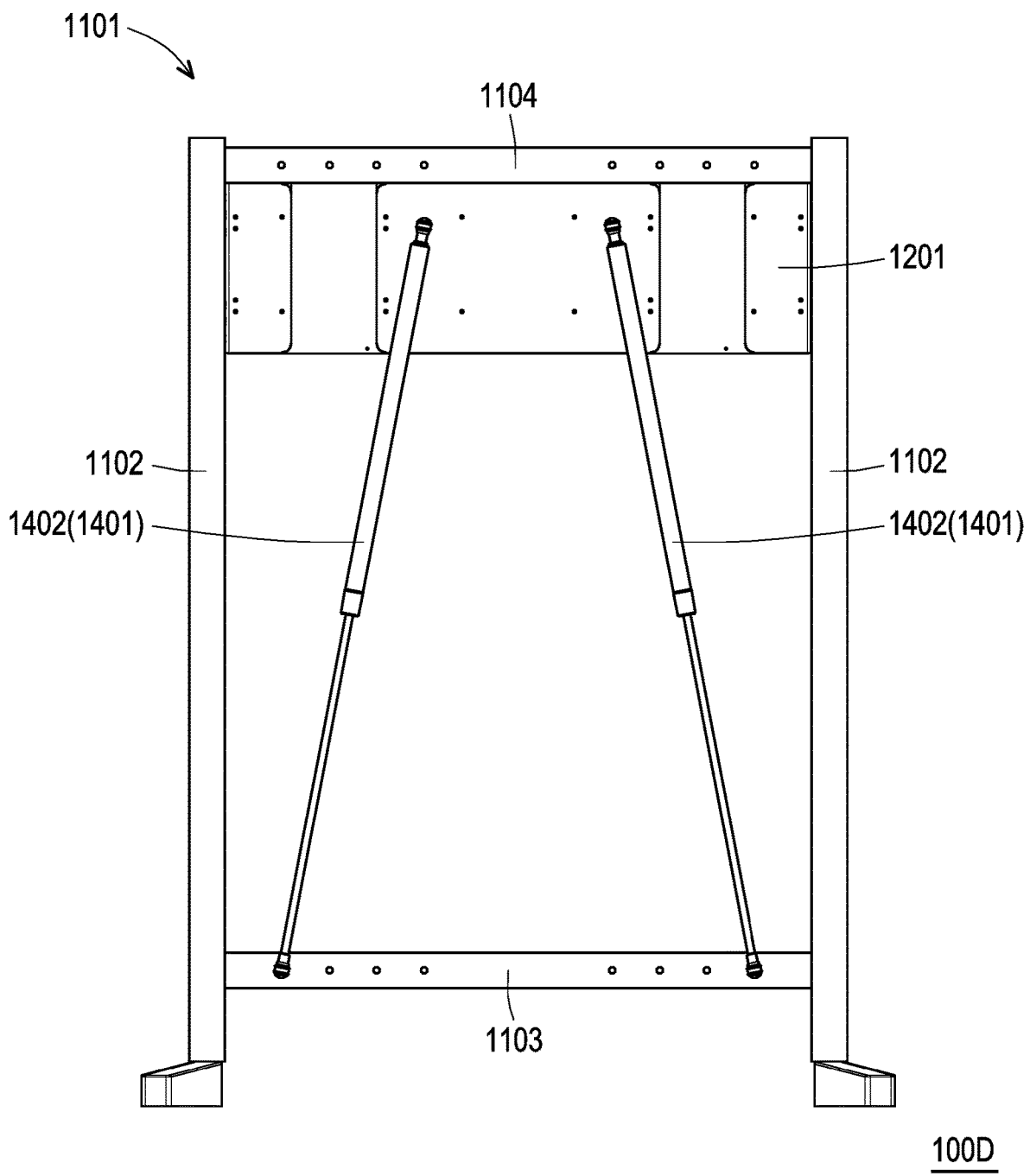
FIG. 5A and FIG. 5B are schematic views of a lifting device according to a fifth embodiment of the disclosure in two different states.
Figure 5B:
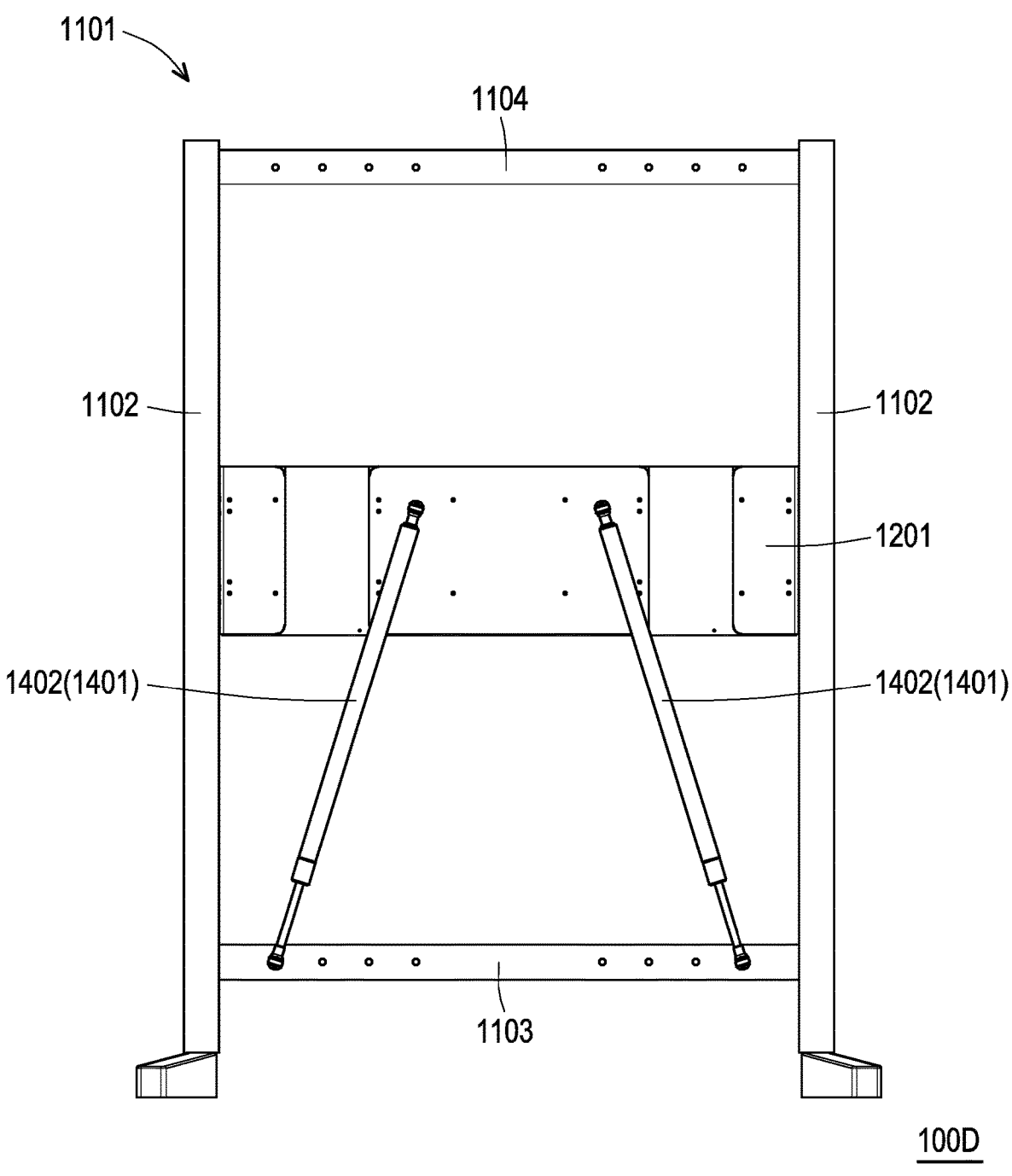
Figure 5C:
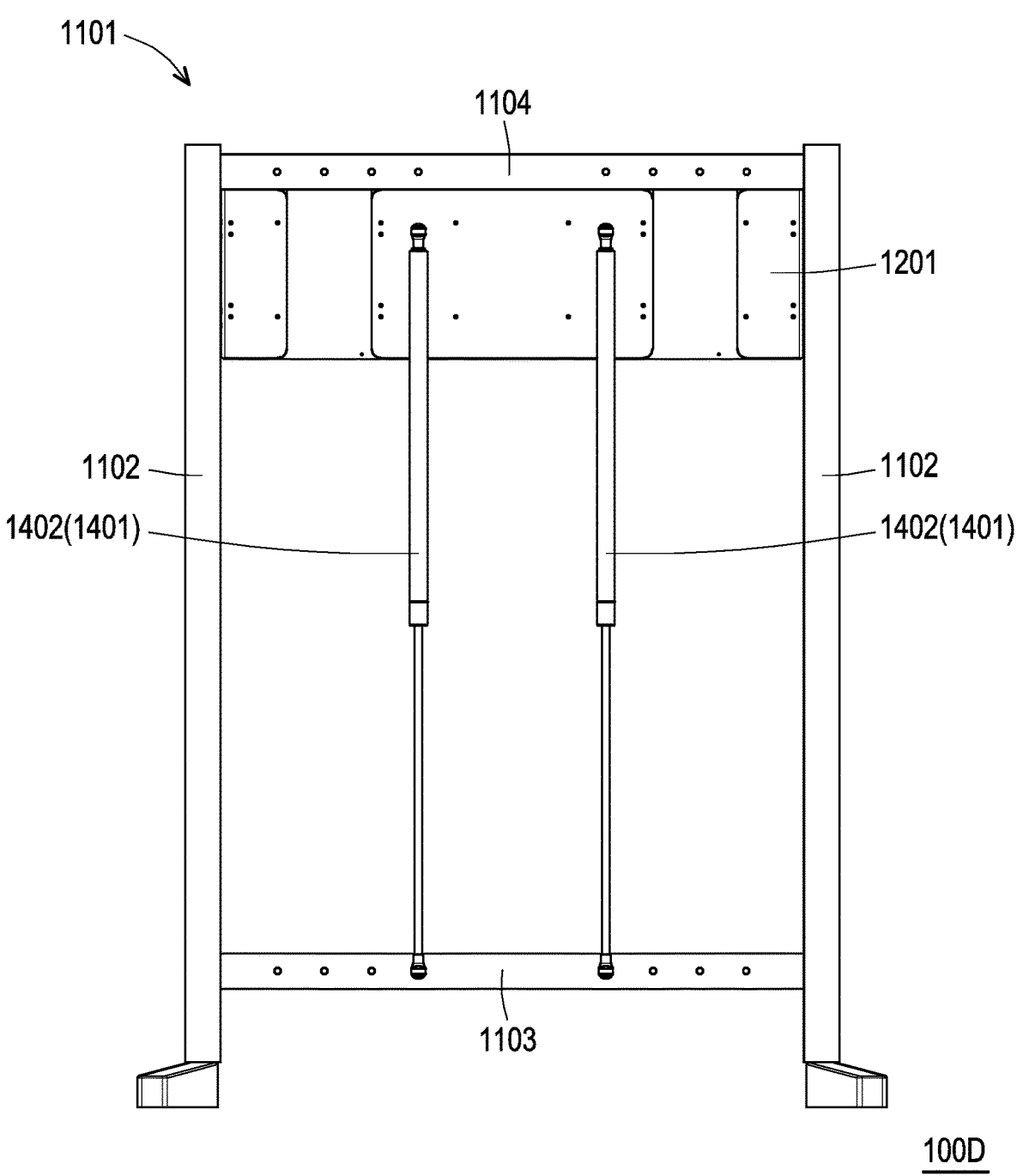
FIG. 5C is a schematic view of the lifting device of FIG. 5A in another mode.
Figure 5D:
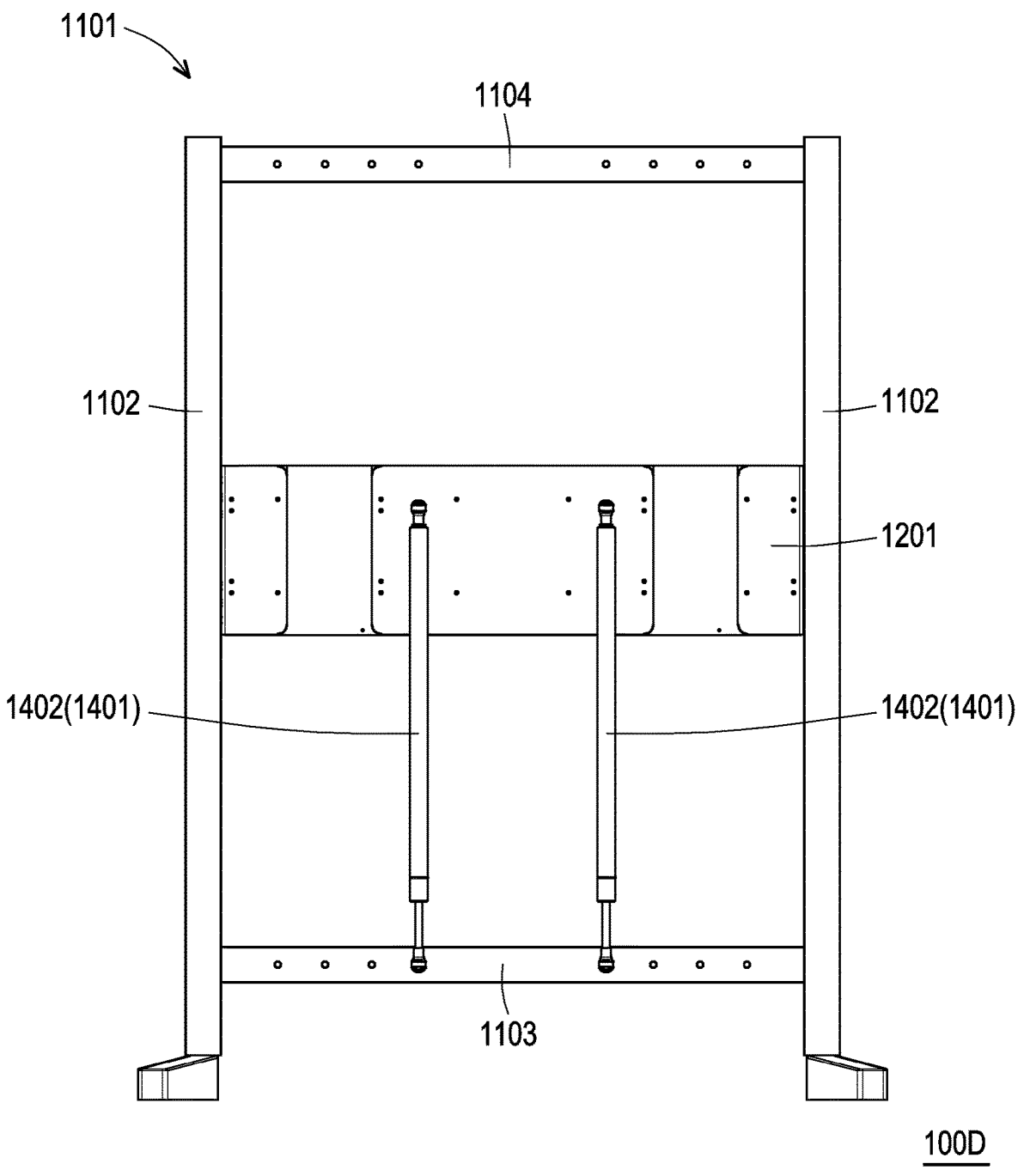
FIG. 5D is a schematic view of the lifting device of FIG. 5C in another state.

FIG. 5A and FIG. 5B are schematic views of a lifting device according to a fifth embodiment of the disclosure in two different states. FIG. 5C is a schematic view of the lifting device of FIG. 5A in another mode. FIG. 5D is a schematic view of the lifting device of FIG. 5C in another state. Please refer to FIG. 5A and FIG. 5B. In contrast to the foregoing embodiments, a stationary member 1101 of a lifting device 100D of the embodiment may be a hollow frame of a supporting stand, which includes two parallel columns 1102, a first beam 1103, and a second beam 1104 parallel to the first beam 1103. The second beam 1104 is disposed above the first beam 1103, wherein two opposite ends of the first beam 1103 are connected to the two columns 1102, and two opposite ends of the second beam 1104 are connected to the two columns 1102. On the other hand, a lifting member 1201 is slidably connected to the two columns 1102 and allowed to slide between the first beam 1103 and the second beam 1104.

In the embodiment, the elastic module 1401 may include two telescopic rods 1402 disposed between the two columns 1102, wherein each telescopic rod 1402 may be a hydraulic telescopic rod or a pneumatic telescopic rod, and two opposite ends of each telescopic rod 1402 are pivotally connected to the first beam 1103 and the lifting member 1201 respectively. When the lifting member 1201 is lowering, the two telescopic rods 1402 may provide a buffering force to the lifting member 1201 which carries the weights of the lifting member 1201 and the display. In contrast, when the lifting member 1201 is raising, the two telescopic rods 1402 may provide an auxiliary lifting force to the lifting member 1201.

As shown in FIG. 5A and FIG. 5C, pivotal positions of the two telescopic rods 1402 on the first beam 1103 may be appropriately adjusted according to the actual situations or the weight of the display. As the pivotal positions of the two telescopic rods 1402 on the first beam 1103 get closer to the two columns 1102, the included angle between each telescopic rod 1402 and the first beam 1103 gradually decreases from 90 degrees as shown in FIG. 5C.

As shown in FIG. 5A and FIG. 5B, the included angle between each telescopic rod 1402 and the first beam 1103 is an acute angle, and the force exerted on the lifting member 1201 by each telescopic rod 1402 may be divided into a vertical component of force and a horizontal component of force. As the included angle between each telescopic rod

1402 and the first beam 1103 decreases, the vertical component of force becomes smaller, which is suitable for supporting the displays with lighter weights.

As shown in FIG. 5C and FIG. 5D, the included angle between each telescopic rod 1402 and the first beam 1103 is a right angle (i.e., 90 degrees), and each telescopic rod 1402 exerts a vertical force on the lifting member 1201, which is suitable for supporting the displays with heavier weights. In addition, the lifting device 100D shown in FIG. 5A to FIG. 5D may be used as a stand to mount the lifting device 100, 100A, 100B, or 100C of the foregoing embodiments on the lifting member 1201, so as to provide a larger travel range for the large displays carried by the lifting device 100, 100A, 100B, or 100C of the foregoing embodiments.

In summary, the user can quickly adjust the height position of the display by simply pushing up or pulling down the lifting member or the display with his/her hand. On the other hand, the elastic module disposed between the lifting member and the stationary member provides the force necessary to support the weight of the display and the lifting member. As the lifting member moves relative to the stationary member, the elastic module may be stretched to generate the elastic force and form the pulling force applied to the lifting member, so as to hold the height position of the display and prevent the lifting member and the display from falling unexpectedly. In addition, the pulling force applied to the lifting member by the elastic module can assist the user in easily pushing up the lifting member or the display. In some examples, the elastic modules are disposed between the lifting member and the stationary member, and the user may choose to activate some or all of the elastic modules according to the weights of the mounted displays, so as to improve the convenience and reliability of operations.

Although the disclosure has been disclosed in the above embodiments, the embodiments are not intended to limit the disclosure. Persons skilled in the art may make some changes and modifications without departing from the spirit and scope of the disclosure. Therefore, the protection scope of the disclosure shall be defined by the appended claims.

What is claimed is:

1. A lifting device of a display, the lifting device comprising:
   a stationary member, suitable for being fixed to a vertical plane;
   a lifting member, slidably connected to the stationary member and suitable for being fixed to a back portion of the display; and
   a plurality of first springs, disposed on the stationary member and connected to the lifting member;
   at least one frictional resistance module, disposed on the stationary member and contacting the lifting member, wherein the at least one frictional resistance module comprises:
      a base, fixed to the stationary member;
      a friction member, movably disposed on the base and contacting the lifting member; and
      at least one elastic member, disposed between the base and the friction member;
   wherein the lifting member slides relative to the stationary member in a vertical direction when the display or the lifting member is subjected to a manual force toward the vertical direction, and the first springs are stretched by the lifting member and exert a first elastic force on the lifting member, wherein the first elastic force is approximate to a weight of the lifting member and a weight of the display;

wherein the lifting member and the display are held at a height position after the display or the lifting member is no longer subjected to the manual force.

2. The lifting device according to claim 1, wherein the first springs comprise a plurality of constant force springs, and the lifting member is suitable to have the display mounted on a mounting structure of the lifting member.

3. The lifting device according to claim 1, further comprising:

at least one sliding rail, fixed to the lifting member, wherein the at least one sliding rail extends vertically; and at least one sliding seat, fixed to the stationary member and slidably connected to the at least one sliding rail.

4. The lifting device according to claim 1, further comprising:

at least one sliding rod, fixed to the lifting member, wherein the at least one sliding rod extends vertically; and at least one sliding block, fixed to the stationary member and slidably connected to the at least one sliding rod.

5. The lifting device according to claim 1, further comprising:

a plurality of second springs, disposed on the stationary member and selectively connected to or separated from the lifting member, wherein when the second springs are connected to the lifting member and the lifting member slides relative to the stationary member in the vertical direction, the first springs stretched by the lifting member generate the first elastic force, and the second springs stretched by the lifting member generate a second elastic force.

6. The lifting device according to claim 5, further comprising:

an elasticity adjusting member, disposed on the lifting member and located between the stationary member and the lifting member, wherein the elasticity adjusting member is suitable for switching between a disengaged position and an engaged position, the second springs are separated from the elasticity adjusting member located in the disengaged position, or the second springs are connected to the elasticity adjusting member located in the engaged position and are connected to the lifting member through the elasticity adjusting member.

7. The lifting device according to claim 5, wherein the second springs comprise a plurality of constant force springs.

8. A lifting device of a display, the lifting device comprising:

a stationary member, suitable for being fixed to a vertical plane;

a lifting member, suitable for being fixed to a back portion of the display;

a linear sliding module, coupled between the stationary member and the lifting member, wherein the lifting member is slidably connected to the stationary member through the linear sliding module so as to vertically slide relative to the stationary member between a first position and a second position lower than the first position;

at least one frictional resistance module, disposed on the stationary member and contacting the lifting member, wherein the at least one frictional resistance module comprises:

a base, fixed to the stationary member;

a friction member, movably disposed on the base and contacting the lifting member; and at least one elastic member, disposed between the base and the friction member; and a first elastic module, coupled between the stationary member and the lifting member, wherein the lifting member slides along the linear sliding module when the display or the lifting member is subjected to a manual force toward a vertical direction, the first elastic module exerts a first pulling force on the lifting member;

wherein the first pulling force is approximate to a weight of the lifting member and a weight of the display, and the lifting member and the display are held at a height position after the display or the lifting member is no longer subjected to the manual force.

9. The lifting device according to claim 8, wherein the linear sliding module comprises at least one sliding rail and at least one sliding seat slidably connected to the at least one sliding rail, the at least one sliding rail is fixed to the lifting member, and the at least one sliding seat is fixed to the stationary member.

10. The lifting device according to claim 8, wherein the linear sliding module comprises at least one sliding rod and at least one sliding block slidably connected to the at least one sliding rod, the at least one sliding rod is fixed to the lifting member, and the at least one sliding block is fixed to the stationary member.

11. The lifting device according to claim 8, wherein the first elastic module comprises a plurality of first springs disposed on the stationary member, and each of the first springs has a movable end connected to the lifting member.

12. The lifting device according to claim 11, wherein the first springs comprise a plurality of constant force springs.

13. The lifting device according to claim 8, further comprising:

a second elastic module, disposed on the stationary member and located between the stationary member and the lifting member, the second elastic module is selectively connected to the lifting member, wherein when the second elastic module is connected to the lifting member and the lifting member slides relative to the stationary member in the vertical direction, the first elastic module stretched by the lifting member exerts the first pulling force, and the second elastic module stretched by the lifting member exerts a second pulling force.

14. The lifting device according to claim 13, further comprising:

a bolt, slidably disposed on the lifting member and located between the stationary member and the lifting member, wherein the second elastic module comprises a plurality of second springs and a positioning member, wherein the second springs are disposed on the stationary member, each of the second springs has a movable end, the movable ends of the second springs are fixed to the positioning member, wherein the positioning member comprises a positioning hole, the movable ends of the second springs are connected to the lifting member when the bolt is inserted into the position hole of the positioning member, and the movable ends of the second springs are separated from the lifting member when the bolt is not inserted into the positioning hole of the positioning member.

15. The lifting device according to claim 14, wherein the second springs comprise a plurality of constant force springs.

15

16

16. A lifting device of a display, the lifting device comprising:

a stationary member, suitable for being fixed to a vertical plane;

a lifting member, slidably connected to the stationary member, wherein the lifting member is suitable for being fixed to a back portion of the display, and the lifting member is suitable for sliding relative to the stationary member between a first position and a second position lower than the first position;

at least one frictional resistance module, disposed on the stationary member and contacting the lifting member, wherein the at least one frictional resistance module comprises:

a base, fixed to the stationary member;

a friction member, movably disposed on the base and contacting the lifting member; and at least one elastic member, disposed between the base and the friction member; and an elastic module, coupled between the stationary member and the lifting member, wherein the lifting member slides relative to the stationary member in a vertical direction when the display or the lifting member is subjected to a manual force toward the vertical direction, the elastic module exerts a pulling force opposite to a gravity direction on the lifting member, wherein the pulling force is approximate to a weight of the lifting member and a weight of the display, and the lifting member and the display are held at a height position after the display or the lifting member is no longer subjected to the manual force.

* * * * *